United States Patent
Soar

(10) Patent No.: US 9,472,971 B2
(45) Date of Patent: Oct. 18, 2016

(54) WIRELESS INDUCTIVE CHARGING OF WEAPON SYSTEM ENERGY SOURCE

(71) Applicant: CYNETIC DESIGNS LTD., Kelowna (CA)

(72) Inventor: Roger J. Soar, Kelowna (CA)

(73) Assignee: Cynetic Designs Ltd., Kelowna, BC (CA)

( * ) Notice: Subject to any disclaimer, the term of this patent is extended or adjusted under 35 U.S.C. 154(b) by 386 days.

(21) Appl. No.: 14/247,209

(22) Filed: Apr. 7, 2014

(65) Prior Publication Data

US 2015/0115880 A1    Apr. 30, 2015

Related U.S. Application Data

(63) Continuation-in-part of application No. 13/502,045, filed as application No. PCT/CA2010/001638 on Oct.

(Continued)

(51) Int. Cl.
| | |
|---|---|
| *H02J 7/00* | (2006.01) |
| *H02J 7/02* | (2016.01) |
| *F41A 35/00* | (2006.01) |
| *F41G 11/00* | (2006.01) |

(Continued)

(52) U.S. Cl.
CPC ............... *H02J 7/025* (2013.01); *F41A 23/18* (2013.01); *F41A 35/00* (2013.01); *F41C 23/22* (2013.01); *F41G 11/00* (2013.01); *H02J 7/0004* (2013.01); *H02J 7/0042* (2013.01); *H02J 50/10* (2016.02)

(58) Field of Classification Search
USPC .......................................... 320/108, 139, 150
See application file for complete search history.

(56) References Cited

U.S. PATENT DOCUMENTS

| 5,264,776 A | 11/1993 | Hulsey |
| 5,542,807 A | 8/1996 | Kruzick |
| 5,550,452 A | 8/1996 | Shirai et al. |

(Continued)

FOREIGN PATENT DOCUMENTS

| EP | 1610439 | 12/2005 |
| WO | 00/16493 | 4/2000 |

OTHER PUBLICATIONS

Martin Gossar et al., Investigations top Achieve Very High Data Rates for Proximity Coupling Devices at 13.56 MHz and NFC Applications, DOI 10.1109/NFC.2011.12.

(Continued)

*Primary Examiner* — Yalkew Fantu
(74) *Attorney, Agent, or Firm* — Antony C. Edwards

(57) ABSTRACT

A charging system for the wireless inductive charging of an energy source in a weapon in a weapon system. The charging system includes a first portion of the weapon system, wherein the first portion has a first inductive coil therein, and a female receiver sized for receiving, in a male-female mating engagement, the first portion of the weapon system. The receiver has a second inductive coil positioned to inductively couple with the first inductive coil when the first portion of the weapon system is in the male-female mating engagement with the receiver. The first inductive coil is adapted for electrical connection to a weapon system platform electrical power supply and has a direct current resistance of less than or equal to substantially 0.2 Ohms so as to be adapted to provide charging power having a peak power of at least substantially 10 watts.

33 Claims, 16 Drawing Sheets

Related U.S. Application Data 13, 2010, now Pat. No. 9,293,927, application No. 14/247,209, which is a continuation-in-part of application No. 11/922,788, filed on Dec. 21, 2007, now Pat. No. 7,863,859, and a continuation-in-part of application No. 12/926,858, filed on Dec. 14, 2010, now Pat. No. 7,994,752, and a continuation-in-part of application No. 12/923,594, filed on Sep. 29, 2010, now Pat. No. 8,791,600, and a continuation-in-part of application No. 13/533,832, filed on Jun. 26, 2012, now Pat. No. 9,126,514.

(60) Provisional application No. 61/809,017, filed on Apr. 5, 2013, provisional application No. 61/272,621, filed on Oct. 13, 2009.

(51) Int. Cl.
*F41A 23/18* (2006.01)
*F41C 23/22* (2006.01)

(56) References Cited

U.S. PATENT DOCUMENTS

| | | | | |
|---|---|---|---|---|
| 5,889,384 | A * | 3/1999 | Hayes | H02J 7/025 307/66 |
| 5,923,544 | A | 7/1999 | Urano | |
| 5,959,433 | A | 9/1999 | Rohde | |
| 6,301,128 | B1 | 10/2001 | Jang et al. | |
| 6,356,052 | B2 | 3/2002 | Koike | |
| 6,388,422 | B1 | 5/2002 | Lew | |
| 6,424,820 | B1 | 7/2002 | Burdick et al. | |
| 6,476,581 | B2 | 11/2002 | Lew | |
| 6,490,176 | B2 | 12/2002 | Holzer et al. | |
| 6,657,351 | B2 | 12/2003 | Chen et al. | |
| 6,906,495 | B2 | 6/2005 | Cheng et al. | |
| 6,960,968 | B2 | 11/2005 | Odendall et al. | |
| 7,076,206 | B2 | 7/2006 | Elferich et al. | |
| 7,149,552 | B2 | 12/2006 | Lair | |
| 7,254,366 | B2 | 8/2007 | Palermo et al. | |
| 7,408,324 | B2 | 8/2008 | Baarman | |
| 7,462,951 | B1 | 12/2008 | Baarman | |
| 7,612,528 | B2 | 11/2009 | Baarman et al. | |
| 7,657,255 | B2 | 2/2010 | Abel et al. | |
| 7,681,788 | B2 | 3/2010 | Van de Velde et al. | |
| 7,728,551 | B2 | 6/2010 | Reed et al. | |
| 7,863,859 | B2 * | 1/2011 | Soar | F41H 1/02 307/104 |
| 7,994,752 | B2 | 8/2011 | Soar | |
| 7,999,417 | B2 | 8/2011 | Kato et al. | |
| 8,035,255 | B2 | 10/2011 | Kurs et al. | |
| 8,169,185 | B2 | 5/2012 | Partovi et al. | |
| 8,385,822 | B2 | 2/2013 | Chatterjee et al. | |
| 8,482,250 | B2 | 7/2013 | Soar | |
| 8,633,616 | B2 | 1/2014 | Soar | |
| 2002/0154518 | A1 | 10/2002 | Elferich et al. | |
| 2004/0145342 | A1 | 7/2004 | Lyon | |
| 2004/0145343 | A1 | 7/2004 | Naskali et al. | |
| 2004/0189246 | A1 | 9/2004 | Bulai et al. | |
| 2004/0232845 | A1 | 11/2004 | Baarman et al. | |
| 2005/0017958 | A1 | 1/2005 | Silverbrook et al. | |
| 2005/0127866 | A1 | 6/2005 | Hamilton et al. | |
| 2006/0087282 | A1 | 4/2006 | Baarman et al. | |
| 2006/0224048 | A1 | 10/2006 | Devaul et al. | |
| 2007/0029965 | A1 * | 2/2007 | Hui | H01F 38/14 320/112 |
| 2007/0171681 | A1 | 7/2007 | Baarman | |
| 2008/0079388 | A1 | 4/2008 | Sarnowsky et al. | |
| 2008/0116847 | A1 | 5/2008 | Loke et al. | |
| 2008/0129215 | A1 | 6/2008 | Boys | |
| 2009/0218884 | A1 | 9/2009 | Soar | |
| 2010/0090491 | A1 | 4/2010 | Hipshier et al. | |
| 2010/0201201 | A1 | 8/2010 | Mobarhan et al. | |
| 2011/0018498 | A1 | 1/2011 | Soar | |
| 2011/0221387 | A1 * | 9/2011 | Steigerwald | B60L 11/182 320/108 |
| 2011/0221391 | A1 * | 9/2011 | Won | H01M 10/44 320/108 |
| 2012/0206097 | A1 | 8/2012 | Soar | |

OTHER PUBLICATIONS

Wireless Power Consortium—System Description, Wireless Power Transfer, vol. 1: Low Power, Part 1: Interface Definition, Version 1.0.3, Sep. 2011.

Wireless Power Consortium—System Description, Wireless Power Transfer, vol. I: Low Power, Part 1: Interface Definition, Version 1.1.1., Jul. 2012.

Standard ECMA-340, Near Field Communication Interface and Protocol—1 (NFCIP-1), 2nd Edition, Dec. 2004.

Standard ECMA-352, Near Field Communication Interface and Protocol—2 (NFCIP-2), 3rd Edition, Jun. 2013.

Standard ECMA-386 Cryptographic Standard Cryptography Standard using ECDH and AES (NEC-SEC-01) 2nd Edition, Jun. 2010.

* cited by examiner

WIRELESS INDUCTIVE CHARGING OF WEAPON SYSTEM ENERGY SOURCE

CROSS REFERENCE TO RELATED APPLICATIONS

This application is a continuation-in-part from U.S. patent application Ser. No. 13/502,045 entitled Inductively Coupled Power and Data Transmission System which is a national phase entry of PCT application no. PCT/CA2010/001638, which claims priority from U.S. provisional application Ser. No. 61/272,621 and is a continuation-in-part from U.S. application Ser. No. 11/922,788 now U.S. Pat. No. 7,863,859, and U.S. application Ser. No. 12/926,858, now U.S. Pat. No. 7,994,752, both entitled Contactless Battery Charging Apparel, and U.S. application Ser. Nos. 12/923,594 and 13/533,832 both entitled Vehicle Seat Inductive Charger and Data Transmission System. This application also claims priority from U.S. provisional application No. 61/809,017 entitled Wireless Inductive Charging of a Weapon System Battery.

FIELD OF THE INVENTION

This invention relates to the field of electrical devices which are charged or otherwise powered by inductive coupling between the device and a charger or power supply, and in particular to a method and apparatus for wireless charging of the energy source for a weapon.

BACKGROUND OF THE INVENTION

The prior art describes the wireless or inductive charging of mobile electronic devices in both indoor environments and also within vehicles so as to remove the clutter and need for various charging cables that plug into the different devices. Inductive coupling frequently uses mechanical, magnetic or printed means of providing or indicating alignment of the primary and secondary inductive coils to enable and obtain optimal transfer efficiencies between the primary transmit circuit and the receiving secondary circuit.

For those devices that are placed in vehicles, Sarnowsky in U.S. D572,189 S shows the implementation of in-vehicle inductive charging to a mobile device placed within a cup holder, while Baarman in U.S. Pat. No. 7,612,528 describes the charging of devices placed within a holder that maybe located in the vehicle console, sun visor, trunk, seat pocket, door stowage compartment and glove compartment. Baarman also describes the ability of a removable device to wirelessly communicate with the vehicle data bus when placed within the holder for the purposes of transferring voice, audio and device charge status data to the vehicle. In his U.S. Pat. No. 7,462,951, Baarman describes the application of inductive charging to hand held tools where a tool box, which maybe placed within a vehicle and connected to vehicle power, is equipped with inductive charging locations into which a portable power tool can be placed to receive a charge. Vitito in U.S. Pat. No. 8,203,657 describes the inductive charging of mobile entertainment system embedded within a car seat headrest.

None of the references cited describe the application of a weapon systems charger either within a battlefield environment, within a vehicle, vessel, aircraft, ect. or in a forward or rear operating base or barrack. All prior art describes the application of inductive chargers in a clean indoor and above floor level format or type of environment such as on top of furniture, within gloves boxes or in vehicle consoles where both the charger and the device are protected from any kind of harsh environmental element. The present invention, eliminates the need for exposed electro-mechanical connections and associated failure prone connectors, and provides a weapon system inductive charger which is an environmentally insensitive, encapsulated power transfer system that can operate in harsh weather or environmental conditions such as mud, sand, dirt, ice, snow, rain and in man made contaminants such as petroleum, oil, lubricants and biological and chemical agents that may be found an example both outside or inside a military or other similar vehicle. Additional battlefield or war-fighting environmental requirements include the ability of the charger to withstand being fully submersed while performing inductive charging functions or being washed down. A further aspect of this invention is the ability of the primary charging receptacle to allow dirt and contaminants to pass through the primary charging device and not collect in the bottom of the primary charger, which over time, as the dirt builds up within, would prevent proper alignment of the primary and secondary coils and impede the function of the device. Further implementations of the present invention weapon charger mechanical design allows a weapon is stock to be inserted into the charger and, using the weight of the weapon, have the receptacle interior faces automatically and independently actuated to move in towards the weapon stock after it is placed within the charging receptacle, ensuring optimal alignment and charging efficiencies. Other implementations would allow for the weapon to be shouldered and fired while being charged.

Conventional modern weapons support a variety of electronic devices that each require their own battery for electrical power. As weapons accessories have been reduced in size due to technological improvement, the ability of the soldier to carry more accessories on his weapon has increased. Examples of weapon accessories requiring power can include tactical light, electronic rifle scope, look through day or night vision, laser light module, thermal vision long range, thermal vision short range, fire control systems, Infra-Red sight, digital compass and weapon system information displays.

Two observations have been made regarding the increase in attachment of electronic accessory devices to a weapon. The first is that it has become apparent that the center of gravity due to the weight of the accessory devices and their batteries has created a detrimental effect on the human factors or ergonomics of the weapon and consequently on the ability of the soldier to use his weapon effectively. The second is that improved weapon power management strategies are required to provide longer periods of weapon use without the need to exchange batteries.

When each accessory device contains its own battery, the weapon system can be considered to have a distributed power system. Most devices use smaller batteries of the 1.5V AAA; 1.5V AA, or 3V CR123/A cell formats, with the batteries often accounting for up to 50% of the mass and volume of the accessory device. As most of the accessories are mounted forward on the weapon, either above the hand grip or fore grip area, the center of gravity for the weapon has been moved forward which in turn has affected weapon handling. It was identified in a NATO RTO human factors study that battery weight could be shifted to better locations on weapon, including butt, pistol grip to assist in locating the center of balance of the weapon. It was identified that a wide range of power architecture options were possible for weapon energy distribution. FIG. 1 illustrates the various energy distribution concepts identified by the NATO/RTO study.

The concepts include the current distributed power or Christmas tree approach (FIG. 1A), a single multi-functional accessory device (FIG. 1B), a one power source powers all of the weapon sensors (FIG. 1C), the battery of one sensor device powers all other devices (FIG. 1D), power provided by a combination of sources (FIG. 1E) and power from external connector going to a soldier system central battery (FIG. 1F). A further power source location identified, was the central power source located in the hand grip of the weapon.

Modern weapon design (FIG. 2) in soldier modernisation programmes describe the application of a powered rail to which multiple electronic devices can be attached and that draw power from typically a common central power source such as a battery. In some instances the power source may be divided into dual power sources due to design or space constraints within the weapon system, or an alternate energy storage device such as a super-capacitor or other appropriate electrical energy storage device. To obtain external recharge power however requires the connection of an external power cable.

The NATO Accessory Rail (NAR), defined by the modernization agreement STANAG 4694, is a new standard for mounting auxiliary equipment such as telescopic sights, tactical lights, laser aiming modules, night vision devices, reflex sights, fore-grips, bipods and bayonets to small arms such as rifles and pistols. STANAG 4694, was approved by the NATO Army Armaments Group (NAAG), Land Capability Group 1 Dismounted Soldier (LCG1-DS) on 8 May 2009. It was forwarded to the NATO Standardisation Agency and then to individual NATO nations, who will test the NATO Accessory Rail system before final ratification.

Weapons of the future will inherently incorporate electronics. New weapons that are being fielded today that were the future weapons of yesterday, are using smart laser guided munitions that are programmed at the moment they are fired. Laser range finders, targeting system and many other accessory devices as they become smaller, will eventually be integrated into the weapon with a rechargeable weapon system battery or energy source providing the electrical power. The type of weapon, the type of projectile it fires whether a munition, surveillance device, micro-drone etc, and its propellant may all utilise electronics to enhance the weapons functionality. For example, in the future, soldiers may carry man-portable rail guns that apply electrically powered magnetically accelerated projectiles. These type of weapons may utilise rechargeable central power sources that require considerable amounts of rapid power transfer.

An example of a newly fielded weapon is the US Army XM25 CDTE (the "XM25") which fires 25 mm grenades that are set to explode in mid-air at or near the target. A laser rangefinder in the weapon is used to determine the distance to the target. The user can manually adjust the detonating distance by up to 10 feet (3.0 m) shorter or longer; the XM25 automatically transmits the detonating distance to the grenade in the firing chamber. The grenade tracks the distance it has traveled by the number of spiral rotations after it is fired, then detonates using an electronic fuse at the proper distance to produce an air burst effect. These features make the XM25 more effective than traditional grenade launchers at the task of hitting targets that are behind cover or dug into the ground. The XM25 features the following electronic components: thermal sight, laser rangefinder, ballistic computer, digital compass (cant, bearing, tilt), electronic fuze setter, internal display, environmental sensors. Of the few improvements to be made to the XM25, one is to extend its battery life.

All of the above, and others in their respective generic hand-held man-portable weapon classes, including those under development now or hand-held in the future, will benefit from having their respective energy sources charged at high rates while stowed, housed, shipped, chambered, magazined (ie. loaded in a magazine), etc., ready for immediate use, or quickly being readied for use, without the needed for a soldier/technician to plug in and unplug a charging cable.

Manufacturers are now starting to provide powered rails for weapon accessories. Two examples are the Wilcox Industry and T-WORX Ventures powered rails.

The T-WORX™ ventures powered rail (see for example U.S. Pat. No. 7,627,975) has a central battery in the butt of the weapon which provides electric power to the accessory rail system.

The Wilcox Industry FUSION AMP™ Rail provides an "electrical power management system" to control a line of accessories that do not have individual battery compartments. The Wilcox FUSION™ Vertical Grip Module is a three volt system that houses a "Quick Change" Grip Power Cassette™ that can be adjusted at any point along the six o'clock rail for operational comfort and moves the weapon's center of gravity for better weapon handling. One change of the battery recharges power to all of the attached accessories. The system allows for independent control of the desired accessories and the low-profile design reduces the snag hazard when handling the weapon.

When a soldier has a powered rail the soldier currently has three options with which to maintain electrical power in the weapon: replace the main battery as done with the Wilcox and T-WORX™ powered rails, and the NATO/RTO concept FIGS. 1C, 1E, 1F; charge the weapon's central battery inductively in an opportunistic fashion through the use of primary coils on the torso or shoulder of the soldier and a secondary receiving coil in the stock of the weapon; or, charge the weapons central battery using a cable and connector to plug into power, either at forward operating base, connecting to a vehicle power source, using a portable power scavenger or anything else where there is suitable power to plug into.

A fourth alternative, and what is described herein, is to inductively fast charge the weapon central energy source, such as a battery, when on or in what is referred to herein as a weapon system platform having an integrated power supply, which may be in a vehicle, aircraft, spacecraft, boat, submarine, etc., or at forward operating base ("FOB") or wherever there is a suitable source of power so as to employ weapon wireless fast-charging according to the various aspects of the present invention.

SUMMARY OF THE INVENTION

The present invention may be characterized, in one aspect, as including a charging system for use in a weapon system containing a charger and a man-portable weapon having a corresponding energy source. The charging system is for the wireless inductive charging of the energy source in the weapon. The charging system includes a first portion of the weapon system, wherein the first portion has a first inductive coil therein, and a female receiver sized for receiving, in a male-female mating engagement, the first portion of the weapon system. The receiver has a second inductive coil positioned to inductively couple with the first inductive coil when the first portion of the weapon system is in the male-female mating engagement with the receiver. The first inductive coil is adapted for electrical connection to a weapon system platform electrical power supply and has a direct current resistance of less than or equal to substantially 0.2 Ohms so as to be adapted to provide charging power having a peak power of at least substantially 10 watts.

The weapon system platform electrical power supply is an integrated power supply on a weapon system platform chosen from the group which includes: a motorized vehicle, an aircraft, a water-bourne craft, a water-submersible craft, a spacecraft, a forward-operating base.

In one embodiment the receiver may advantageously include a drain adapted to facilitate draining and cleaning of environmental fluids, and solids, from the receiver. When the receiver is positioned for use, referred to herein as a use position, the drain drains the environmental fluids while the first portion of the weapon system is in mating engagement with the receiver, and is, when in the use position, adapted for ejection of solids collecting in the receiver.

The receiver defines a support cavity for supporting therein the first portion of the weapon system when the first portion of the weapon system is in mating engagement with the receiver. The cavity is sized relative to the first portion of the weapon system for a snug fit therebetween and to allow draining and ejection of the environmental fluids and solids from the support cavity.

Advantageously, according to the various embodiments described therein, the receiver is chosen from the group which includes:
 a) a stock receptacle formed in a stock of the weapon, wherein the first portion of the weapon system is a charging base,
 b) an inclined rest wherein the first portion of the weapon system is a portion of the weapon, and wherein the first portion of the weapon rests on, so as to be supported in mating engagement, on the rest,
 c) a platform receptacle wherein the first portion of the weapon system is a portion of the weapon, and wherein the first portion of the weapon is slidably journalled in the receptacle,
 d) a storage means.

In one embodiment the first inductive coil has a direct current resistance of less than or equal to substantially 0.15 Ohms so as to be adapted to provide charging power having a peak power of at least substantially 20 watts. In a further embodiment the first inductive coil has a direct current resistance of less than or equal to substantially 0.12 Ohms so as to be adapted to provide charging power having a peak power of at least substantially 50 watts. In a further embodiment the first inductive coil has a direct current resistance of less than or equal to substantially 0.1 Ohms so as to be adapted to provide charging power having a peak power of at least substantially 75 watts. In yet a further embodiment the first inductive coil has a direct current resistance of less than or equal to substantially 0.075 Ohms so as to be adapted to provide charging power having a peak power of at least substantially 100 watts.

In one embodiment the charging base is a dongle. The charging base may further include a flexible, electrically conductive umbilical adapted to be attached to, so as to extend between, the dongle and the weapon system platform electrical power supply.

In one embodiment the stock receptacle is formed in a butt end of the stock, adjacent a user when the weapon is in it's use position. The inclined rest or the platform receptacle may be mounted elevated on a stand. The platform receptacle may be mounted to one of the weapon system platforms. The platform receptacle may include a tube or channel defining the support cavity. The drain on the stock receptacle or the platform receptacle may be an opening at a lower end of the support cavity when in the use position.

In one embodiment the receiver is shielded and the first portion of the weapon system and the receiver are adapted for data transfer using inductive coupling therebetween.

The charging system of the present invention for the wireless inductive charging of an energy source associated with a weapon system which includes a weapon may also be characterized, in a further aspect, as including a charging portion of the weapon system, wherein said charging portion includes a first inductive coil. The charging system also includes a charging base having a second inductive coil. The charging portion and the charging base are adapted to inductively couple with one another in a male-female mating engagement so as to form an inductive coupling. At least one of the charging portion or the charging base may include a drain for removal of environmental detritus, solids, or fluids from within intervening proximity with the inductive coupling.

The first inductive coil is adapted for electrical connection to a weapon system platform electrical power supply. The first inductive coil has a direct current resistance of less than or equal to substantially 0.2 Ohms so as to be adapted to provide charging power having a peak power of at least substantially 10 watts. The weapon system platform electrical power supply is an integrated power supply on a weapon system platform chosen from the group which includes: a motorized vehicle, an aircraft, a water-bourne craft, a water-submersible craft, a spacecraft, a forward-operating base.

In one embodiment the weapon has a stock and the charging portion is the stock of the weapon. The charging base may be chosen from the group comprising: a plug-in dongle, and wherein the charging portion includes a cavity sized to receive the dongle into the inductive coupling, or a receiver sized to receive the charging portion therein into the inductive coupling.

The dongle may be mounted on a flexible electrical cord. The weapon may have a butt and the charging portion of the weapon is the butt of the weapon. The receiver may be mounted on a stand, and the stand may be adapted for mounting to the weapon system platform.

The receiver may be an upwardly-opening charging receptacle adapted to receive the charging portion. The charging portion may be held, at least in part, in the charging receptacle by gravity acting on the weapon. The charging receptacle may have an upwardly opening cavity for receiving the charging portion therein in the inductive coupling. The cavity may provide for substantially vertical or angled entry of the charging portion into the charging receptacle.

The charging receptacle may be for example an inclined or horizontal weapon rest, or for example an inclined tube. The charging portion may be chosen from the group including a handgrip, forestock, pistol grip, trigger grip, shoulder-stock, butt, or magazine of the weapon system.

The receiver may include a clamping mechanism, wherein a contact sensor or non-contact sensor reacts to the presence of the charging portion in the receiver, causing surfaces such as sidewalls of the receiver to respond so as to translate or rotate into close adjacency with the charging portion.

DETAILED DESCRIPTION OF EMBODIMENTS OF THE INVENTION

This application incorporates by reference U.S. patent "Contactless Battery Charging Apparel", which issued to Soar as U.S. Pat. No. 7,994,752 B2 wherein Soar describes the inductive charging of a weapon from the soldiers torso garment. Soar's patent describes the opportunistic, low power charging of a weapons integrated central battery by the provision of wireless inductive power from the torso garment of a soldier to the weapon.

The invention described herein, in one aspect, provides high rates of wireless inductive power transfer to allow the fast charging of a weapon's central battery when a soldier is in or on one of the aforesaid platforms, for example when seated in a vehicle, aircraft or at a FOB. Published patent applications by Soar are incorporated herein by reference, for example in one of his published patent applications entitled Vehicle Seat Inductive Charger and Data Transmitter, US Patent Application publication no. US2013/0005251 A1, published Jan. 3, 2013, which identifies various means to provide wireless inductive power to a soldier to charge the central battery worn by a soldier in his soldier system when the soldier is seated in a vehicle seat. From a power management perspective, as described herein, while the soldier system central battery is being charged by the vehicle, at the same time a separate wireless charging power device is provided to charge the soldiers weapon system. Charging the weapons central battery independently while in the vehicle removes the weapon battery as a further load to the soldier system central battery, ie, the wearable battery worn by the soldier. The weapon battery capacity may represent as much as 30-50 percent of the soldier system central battery capacity and represents a significant load when it requires charging. To charge a weapons battery within a vehicle requires a unique design of charger due to both the physical configuration of the weapon, the position in which the weapon is held in the vehicle and when in use, and the environmental conditions found within the vehicle. Often a weapon is held by a soldier upright with the weapon stock on the floor. It follows that a wireless charging system could then interface with the weapon butt or stock (those terms used interchangeably herein), which may also contain the weapon central battery.

Figure 7:
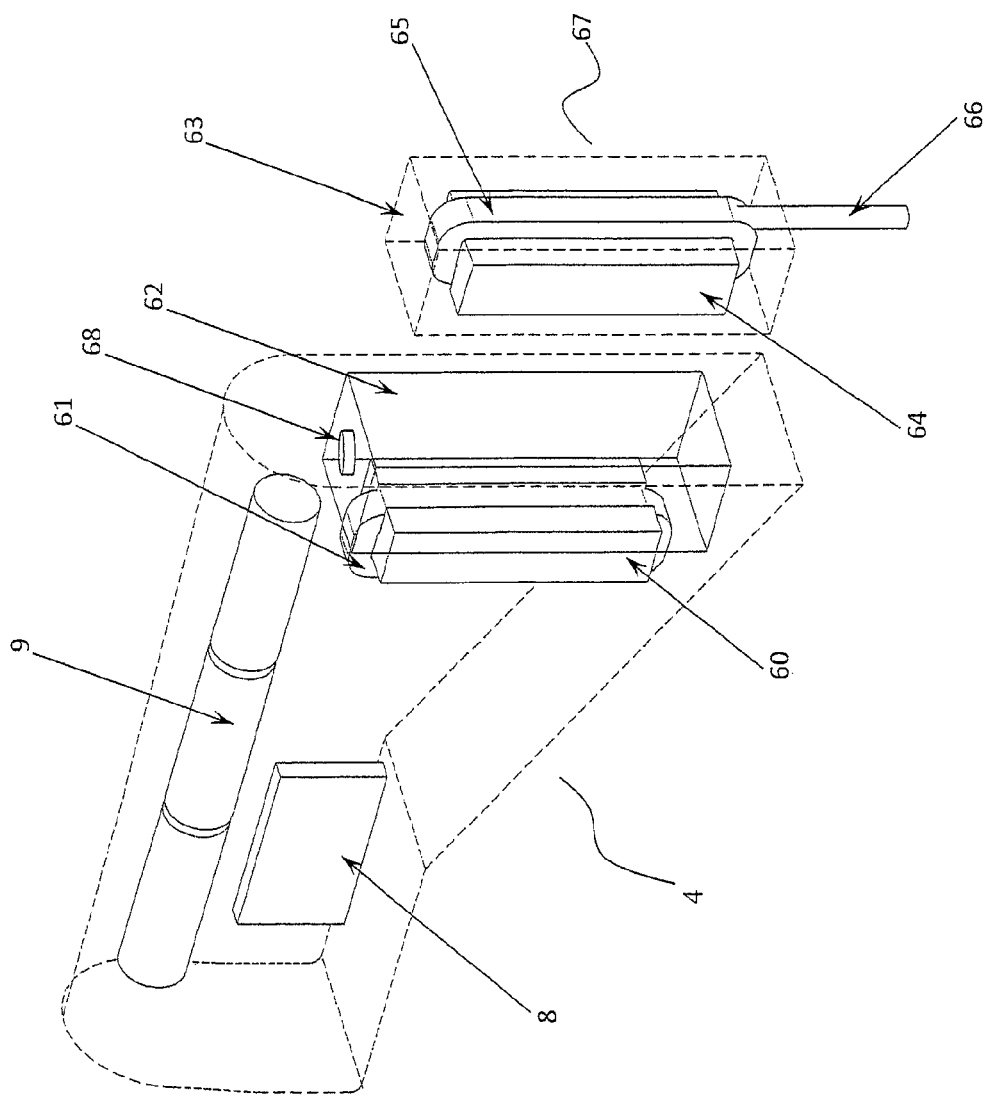
FIG. 7 is yet a further alternative embodiment of the stock of FIG. 4.

The weapon charging system may for example be comprised of a primary charging receptacle per troop seat of the vehicle, that connects and transfers power inductively to the secondary charge receiving circuit contained within the weapon. The in-vehicle primary charger for the weapon may be a socket or receptacle (collectively referred to herein as a receptacle or receiver) that the weapon may be inserted or placed into and from which it may be easily removed when required (FIG. 7). Alternate mechanical configurations for the charger are the primary power circuit and coils being integrated into a pedestal mounted rest interface with the secondary weapon coil integrated into the pistol grip or on the barrel or fore-grip or forestock (those terms used interchangeably herein). Any portion of the weapon system, for example a portion of the weapon or the charger forming part of the weapon system (also referred to herein as a first portion of the weapon), may be fitted with a corresponding inductive charging coil, for example, the secondary inductive charging coils described herein that connect and receive power from a primary charging device. As would be understood by those skilled in the art, weapon system platforms (for example, vehicle, vessel, aircraft, etc) and weapon system designs vary considerably, so consequently many design iterations or configurations of a wireless weapon charging system are intended to be within the scope of this invention. Thus a weapon and it's charger may mate in a male-female mating engagement, wherein either the weapon or the charger will have the female receiver and the other will have the male mating part for mating with the female receiver. In the examples provided herein, the weapon stock may be the male part mating into a female receiver in the charger, or the weapon stock may have a receptacle formed therein to provide a female receiver and the charger has a male part for mating into the receptacle in the weapon stock. As used herein, the term charging base is intended to refer to the charger, whether in a fixed base embodiment or where the charger is a satellite piece for plugging into a female receptacle in the weapon. One example of the latter is provided herein, where an inductively coupling male plug-in part (also referred to herein as a dongle) on the end of an electrical umbilical forms the charging base and mates with a female receptacle on the weapon. As used in this instance, both the weapon and the charger form a weapon system, where a first portion of the weapon system has a first inductive coil for mating with a second portion of the weapon system having a second inductive coil. The first portion of the weapon system may be the stock of a weapon and the second portion of the weapon system in that case will be the charger, or the first portion of the weapon system may be the charger in which case the second portion of the weapon system will be the weapon. The first portion of the weapon system mates in male-female engagement with the second portion of the weapon system so as to inductively couple the first and second inductive coils for the fast charging of the energy source associated with the weapon and its accessories (the weapon and its accessories also collectively referred to herein as the weapon).

With a high capacity rechargeable energy source within the weapon, it is possible to provide high power transfer rates and power transfer efficiencies. With five watts of power transfer, efficiencies of 70%-75% can be achieved. At 20 watt power transfer rates, greater than 85% system power transfer efficiencies can be obtained. The objective is to transfer power to the weapon as quickly as possible whenever there is an opportunity for the soldier. An example of weapon system form factor compatible battery would be four 18650 Lithium ion cells, which can be configured to provide several operating voltages. For example if 3.0 AHr capacity cells are used, the battery can be configured to provide 3.7 VDC at 12.0 A; 7.4 Vdc at 6.0 A or 14.8 VDC at 3.0 A. Regardless of the battery configuration, the available power would nominally be 44 W. A battery pack of this capacity would typically allow a 25 W max charge rate at 0.6 C. If individual cell balancing is provided, charger rates of up to 30 W at a 0.75 C rate and 44 W at a 1 C rate would be possible allowing the battery pack to be charged within an hour. A weapon inductive charging system therefore should be capable of providing at least 10 watts of power transfer to as much as 100 watts or greater, as power demands by weapon systems increase in the future. Other battery pack voltages and capacities or other rechargeable energy sources such as super-capacitors can be wirelessly charged. Although the intent of this invention is to inductive charge the central battery, the central battery may still be removable from the weapon and be replaced with an already energized battery when required and as available.

Power from the weapons central energy source may be received by an energy drain on the weapon in several ways, including direct connection with a cable, cable connection to a powered rail, integrated wired or e-textile wiring harness, flexible printed circuit or other conductive means of distributing electric power, for example to the weapon accessories.

Charging Socket

Figure 4:
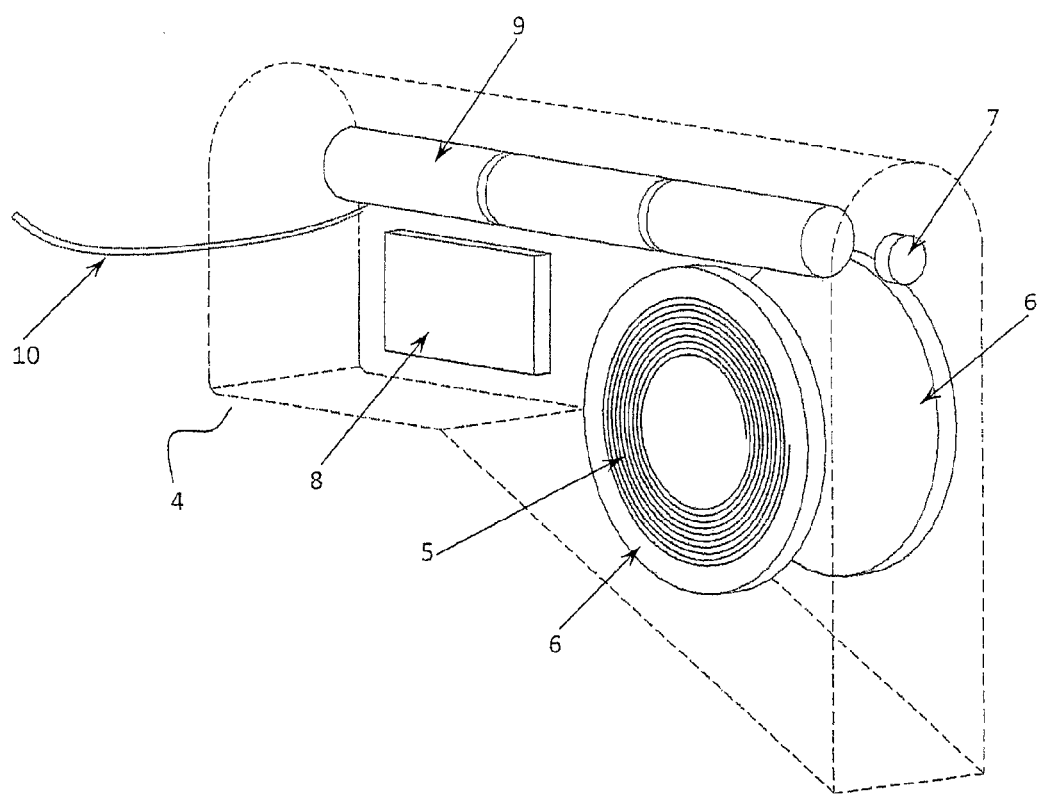
FIG. 4 is an enlarged view of the stock of FIG. 3.
Figure 5:
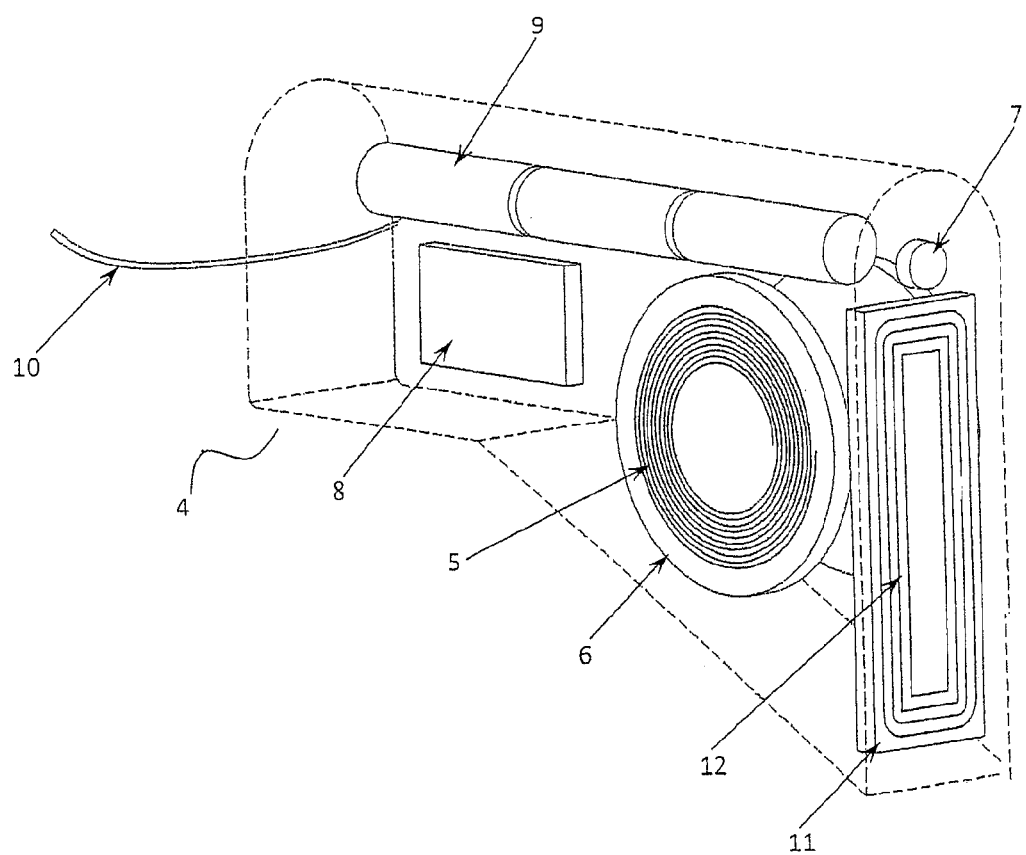
FIG. 5 is an alternative embodiment of the stock of FIG. 4.

A wireless inductive charging capability can be provided to any one or, multiple faces of the weapon stock (FIG. 4). In a keyed design configuration, the primary charging receptacle is of a size and shape such that the weapon stock can only fit into the receptacle in a given orientation so as to ensure the primary coil in the receptacle and the secondary coil on the weapon are properly aligned and proximal to each other to provide their inductive coupling. Alternatively, in a non-keyed receptacle design, if a secondary inductive coil is located on only one side of the stock it would be possible to have two inductive primary coils set up as a two coil array being driven by a single primary drive circuit or with a primary inductive drive for each primary coil. Other design iterations may require three coils, a primary coil in the base of the receptacle that interfaces with a secondary coil placed on the end of the stock and interfacing primary and secondary coils on any other faces of the stock (FIG. 5, 8). In a non-keyed charging receptacle, regardless of the coil implementation or design used, the soldier will be able to drop his weapon into the charging receptacle without regard for the orientation of his weapon.

In some designs the end of the stock has a recessed receptacle so as to recess the secondary coil(s) within the stock, in which case a charging base dongle containing the primary coil(s) may be provided to plug into the receptacle to inductively couple the primary and secondary coils. The charging base may include an upwardly protruding male dongle to mate within the charging receptacle on the weapon stock, or the charging dongle may be used as a satellite charging base for example when connected by an electrically conductive umbilical to the mains power on the weapon system platform.

Regardless of the number of primary inductive coils used in the charging socket design, each coil can be powered or driven by its own primary drive circuit or as an automatically selected coil within an array. The primary drive electronics can be mounted directly onto the receptacle or be remotely positioned. If remotely positioned the coils AC drive signal power cable will have to be shielded and armoured as it may be on the floor of the vehicle or otherwise subject to both mechanical wear and tear and harsh environmental conditions. If the primary drive is mounted on the socket and in the sight line of a soldier, it would be possible to have status LED's that let the soldier know the state of charge of the weapon battery. The weapons secondary charging circuit may communicate state of charge to the primary charger by either modulating the inductive power signal or using a separate data communication system and protocol using for example Near Field Communication (NFC), Bluetooth, Wi-Fi, Zig Bee or other wireless communication means. So that the inductive charging system is not a constant draw on the vehicle power, an inductive polling processor would keep the main drive coil in stand-by mode until a weapon stock is placed into the charging socket. A proper response via inductive communication from the secondary inductive charging circuit after it is polled is required before the primary transmitter will turn the main charge power on. This routine both reduces power usage when a weapon is not in place and protects the system from foreign metal objects that could be inserted into the socket or from a weapon not equipped with a charging system turning on the primary power and causing the system damage. Alternate methods of sensing a weapons presence within the charger are proximity circuits such as hall effect sensors and mechanical switches.

Figure 8:
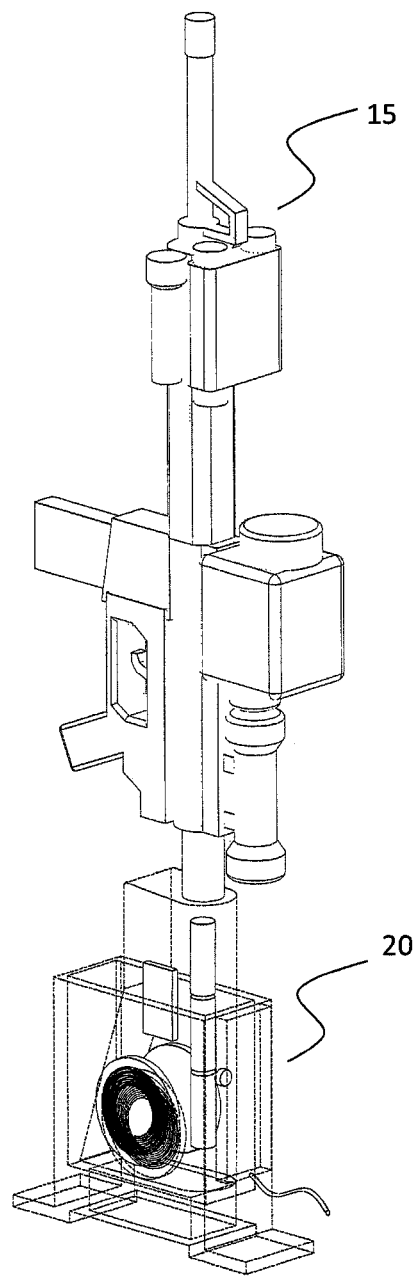
FIG. 8 is, in perspective view, the weapon of FIG. 3 mounted in a floor-mount, vertical-entry embodiment of a charging receiver.

The main housing of the charging socket or receptacle can be made using any robust construction material such as steel, aluminum, composite or polymers that can withstand the rigours of a mounted device within a military vehicle. The primary coils would be placed within a wall of the receptacle facing towards the weapon (FIG. 8). An air gap of typically 0-2 cm would exist between the primary coil face and secondary coil in the weapon stock, to keep the size of the receptacle to a minimum. Larger gaps between the primary and secondary are possible if the design so dictates. The gaps provide for the drainage of fluids either into a drainage aperture or so as to drain from the receptacle when the receptacle is tipped or rotated as required to clear it of fluids or solids such as ice, debris or other detritus.

The utilization of a ferrite backing on the primary or secondary coils improves the inductive power transfer efficiency and reduces any effect of surrounding metal structural material on the inductive magnetic field. If required, additional shielding materials such as rigid ferrite tile or flexible ferrite polymers or other appropriate materials may be placed within the charging receptacle outer enclosure to reduce the charging systems electrical and magnetic emissions.

A further mechanical design iteration is to have the primary charging socket or receptacle automatically size itself to the weapon stock size or shape so that the charger could accommodate a range of sizes and shapes of weapon stock placed into it, while keeping the primary charging coils proximal to the secondary charging coils in the weapon stock to maintain optimal power transfer efficiency (FIG.

15). The charging receptacle can size itself with any of several methodologies such as mechanical, hydraulic, pneumatic or electrically actuated mechanisms. For example mechanically adjusted side wall clamps actuated by a lever mechanism or other contact sensor may move side plates with integrated primary coil assemblies. Electrical systems may use a switch that activates a solenoid circuit to move the clamping fixture and primary coil assembly against the weapon stock. One or more sides of the charging receptacle may be activated as part of the clamping system. The weight alone of the weapon may in some designs provide sufficient force to operate the clamp mechanism, while in other design iterations, the presence of the weapon will be required to activate the clamping features.

Weapons and weapon electronic accessories and their power sources are very exposed to the elements. A significant benefit of an inductive charging system is that it can be fully encapsulated and completely sealed against environmental fluids and solids such as water, dust, ice, snow, debris, rocks, and POL's. An inductive power transfer or charging system will still operate at its design efficiency when fully submersed, enabling energy transfer to a weapons power system and allowing its use at all times, in any environment, inside or outside of the vehicle. Magnetically coupled charging systems will transfer power through any water and mud left on the weapon. This allows the inductive charger to be used for example in the interior of an LAV, topside of an open troop carrier, or the open deck of a small patrol boat. The charging system may be placed in any of multiple locations and still provide wireless or non electro-mechanical connector power transfer to a weapon. Other locations where wireless power to a weapons system can be used is inside storage bins, or within magazines (for charging smart or powered munitions, micro-drones, etc.) or placed on bustle racks or in other devices forming electrical or electronic parts of a weapon system.

To prevent the accumulation of dirt, snow or other physical contaminants such as a small rock within the charging receptacle that may prevent the primary and secondary coils from having other than optimal alignment, the receptacle may be a drain, aperture, a debris passageway or chute, for example positioned. in the center of the receptacle. The primary opening into the receptacle may be also used as the drain aperture. The passageway allows dirt to simply fall or be washed through the receptacle without it accumulating. Under-cuts in the wall of the outer housing of the receptacle allows the dirt to exit the housing. Any ice that may accumulate during outdoor winter application can be pushed through the receptacle versus having to scoop or otherwise remove dig it out.

Inductive charging can be enabled to a weapon stock that is constructed from any of the standard weapon fabrication materials such as metal, plastic and composite through the appropriate use of ferrite backing and other materials such as Mu metal or Hypershield™ that selectively shape or shield magnetic fields. Folding or non-folding stocks can be accommodated.

Some bullpup configuration weapons such as the L85A2 have sheet steel sides that extend to the butt of the weapon stock. The steel sheet does not allow the transmission of magnetic flux therefore a charging receptacle with for example planar coils and a weapons system with planar coils in the cheek face of the stock would not work. To charge this type of weapon, elongated U-core ferrites with coil windings can be used as the primary and secondary wireless power magnetic flux guides. Other geometries of ferrite such as E-core, cylindrical pot cores could be adapted for use. A U-core ferrite secondary coil would be located at the base of a recess within the weapon butt and fit onto a mating protrusion in a male/female mating, for eg. within a receptacle that contains the primary inductive coil.

A further adaption of this configuration and location of coil design would be a weapon charging system that could be designed such that it is not fixed or mounted within the vehicle, but instead the primary coil is located in a plug-in dongle mounted on an umbilical cable (FIG. 7). The dongle plugs into the recess in the butt of the weapon. In open vehicles or vessels where there may be an expectation of being able or having to fire a weapon, for example while on patrol, this system allows a soldier when on patrol to charge a weapon while slung, and then if needed the weapon could be shouldered without having to disconnect. The primary coil dongle could be retained within the weapon butt by several means such as magnetically or a spring loaded mechanical latch that would have a pre-set release so that the weapon would not be restrained when the soldier swung the weapon, or stood up in the vehicle or left the vehicle.

In some instances a vehicle may be configured such that all weapons are placed into a central rack, in which case the base or side of the rack containing the weapon butt could be fitted with a row of charging receptacles.

A secondary inductive charging system located within the weapons stock can also be used to receive charge from a primary inductive charging circuit that is placed on the torso of a soldier as described by Soar "Contactless Battery Charging Apparel", U.S. Pat. No. 7,994,752 B2. Soar describes the ability of a weapon to receive opportunistic charge from a primary inductive coils placed at either hip or shoulder locations. The secondary inductive coils and charging circuits on the weapon intended to receive high levels of power from a vehicle charging socket may also be designed such that they will inductively connect too and receive energy from a low power primary charger location on a soldiers torso.

When a soldier enters a vehicle it may be assumed he will be in the vehicle for only a short period of time. To charge the weapons battery quickly requires that the battery be fast charged, which depending on the battery chemistry or mechanical design may be a charge rate from as low as 0.5 C to 10 C or higher. The maximum charge rate for Lithium chemistry batteries may also be determined by the battery charging circuit and the battery protection module or sub-circuit and the safety mechanism that are used to protect the battery. For example a battery can be charged at a higher C-rate if the battery management or protection module protects against over-voltage, over-current, short circuit, over temperature and provides cell balancing. As with any battery charging system regardless of battery chemistry, once the weapons battery is fully charged a wireless inductive charger will step down into a reduced charge mode until it is placed in a trickle charge maintenance mode. Wireless chargers that are placed in areas where it may be anticipated the weapon will be stored for longer periods of time such as in a vehicle storage box or locker, base storage locker, barracks charging location for example, which are examples of storage means referred to herein, then charger can be configured to operate either as a fast charger or as a conditioning charger where the battery could be completely discharged before it is recharged at a lower charge rate.

When future weapons with very fast charge rate power sources such as super-capacitor banks are developed, the primary and secondary circuits of the inductive wireless charging system can be modified to accommodate the control circuits and output voltages required for the newer technology.

Primary Drive Circuit

The fundamental circuit technology employed in this device is a resonant tank circuit that is inductively coupled to a secondary coil and associated circuits and forming an air core transformer. The required primary circuit electronics are comprised of both control and inductive resonant circuits. The primary side typically includes but is not limited to a frequency generating or oscillator circuit, power switching driver(s) such as a MOSFET full or half bridge driver that in turn would power the LC resonant tank circuit placing a current through the coil and with the option of a feedback loop to maintain optimal resonant frequencies (FIG. 15). Input power for the primary circuit would be provided from the DC power bus of for example the vehicle, aircraft or vessel, referred to herein as the weapon system platform. If required, there may be two or more independent primary circuits each leading to primary coils located in different places on a charging receptacle, which in turn inductively connect to secondary coils and charging circuits that may be each placed in different areas of the weapon system. Alternate drive circuits that generate an AC magnetic field that may be used include resonant and non-resonant circuits such as LLC, LCC or other architectures.

The primary circuit may be tuned to a single frequency i.e 200 kHz or be an auto tune circuit that maintains resonance over a small range of frequencies as external factors and the location of the secondary coil dictate. Many topologies or architectures of this circuit can be constructed depending on the needs identified or specific design requirements that accommodate different frequencies, impedance, inductance and capacitance of the major components. The resonant frequency of this device would typically be selected within the range of 100-500 kHz, but certain applications may require operation into the ten's of MHz. The resonant characteristics of the tank circuit will change as the distance between the primary and secondary coil distance changes due to the mutual inductance of the primary and secondary coils changing, which in turn changes the apparent inductance of the primary coil and so changes the resonant frequency of the drive circuit. The primary inductive resonant circuit may therefore be auto-tuned to work at a pre-determined operating distance so as to obtain optimal performance. In many inductive power charging applications the primary drive circuit is co-located with the primary drive coil such as at the weapon charging receptacle, however the primary circuit may also be a short distance (eg. 10-50 cm) from the receptacle on the floor, seat frame or other structure of the weapon system platform, with a shielded cable connecting the primary coil to the primary drive circuit.

Through shielding and appropriate circuit design, the primary circuit must not cause disruptive EMI or be susceptible to EMI.

Secondary Charging Circuit

The secondary voltage conditioning and charging controller circuit may be co-located with the secondary or receiving inductive charging power coil on the weapon system. The secondary circuit provides rectification of the received inductive AC power signal, voltage regulation as required and passes power to the weapon energy source charging and control circuit. The charging circuit monitors the charge required by the energy source and charges it accordingly when power is available from the primary inductive system. The primary circuit inductively interrogates the secondary circuit to firstly determine if it is present and secondly it may determine the charge status of the energy source. If the energy source is at full charge and does not require charging as reported by the secondary circuit, the primary circuit removes charging power and falls back into interrogate only mode.

The energy source, such as a central battery (or batteries) of the weapon system can be of any type of rechargeable battery although a high capacity Li-Ion battery or similar is preferred due to its high energy density. The battery can be of conventional box or cylindrical shape configuration or a battery that conforms to the geometry of the weapon stock. The central battery maybe removable from the weapon so that it can be field replaceable should it become depleted while on patrol.

Proximity Detector

As previously mentioned, one method of providing for a more energy efficient operation of the weapon charging system is for the primary drive circuit to include a low power proximity sensing circuit. This circuit may for example be inductive, capacitive or a hall-effect sensor located within the receptacle that senses a magnetic trigger within the weapon stock. A further example is a mechanical switch embedded within the charging receptacle that is only switched by the presence of a weapon in the receptacle.

Instead of a hardware or mechanical device being used as the secondary circuit proximity detector, the primary power circuit can be used to ping or poll for the secondary circuit. Many circuit options are available, one is that the auto tune circuit looks for a change in the inductance of primary coil. As the secondary coil is brought into proximity, its mutual inductance as it couples with the primary coil changes the inductance of primary coil. This can be detected by the auto-tune circuit of the primary coil. A second example is that the primary coil data circuit would poll for the presence of a secondary circuit on a regular basis with an acknowledgement using a modulated inductive response sent back from the secondary circuit.

Primary and Secondary Coil Configuration

Figure 6:
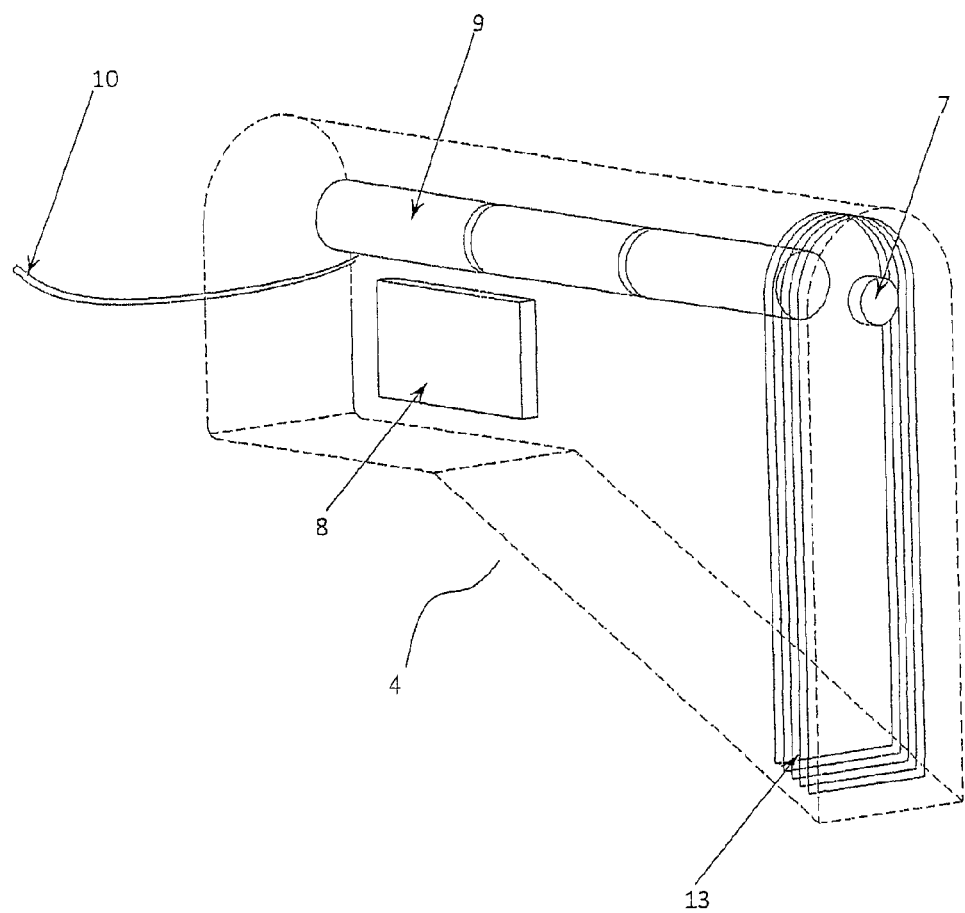
FIG. 6 is a further alternative embodiment of the stock of FIG. 4.
Figure 11:
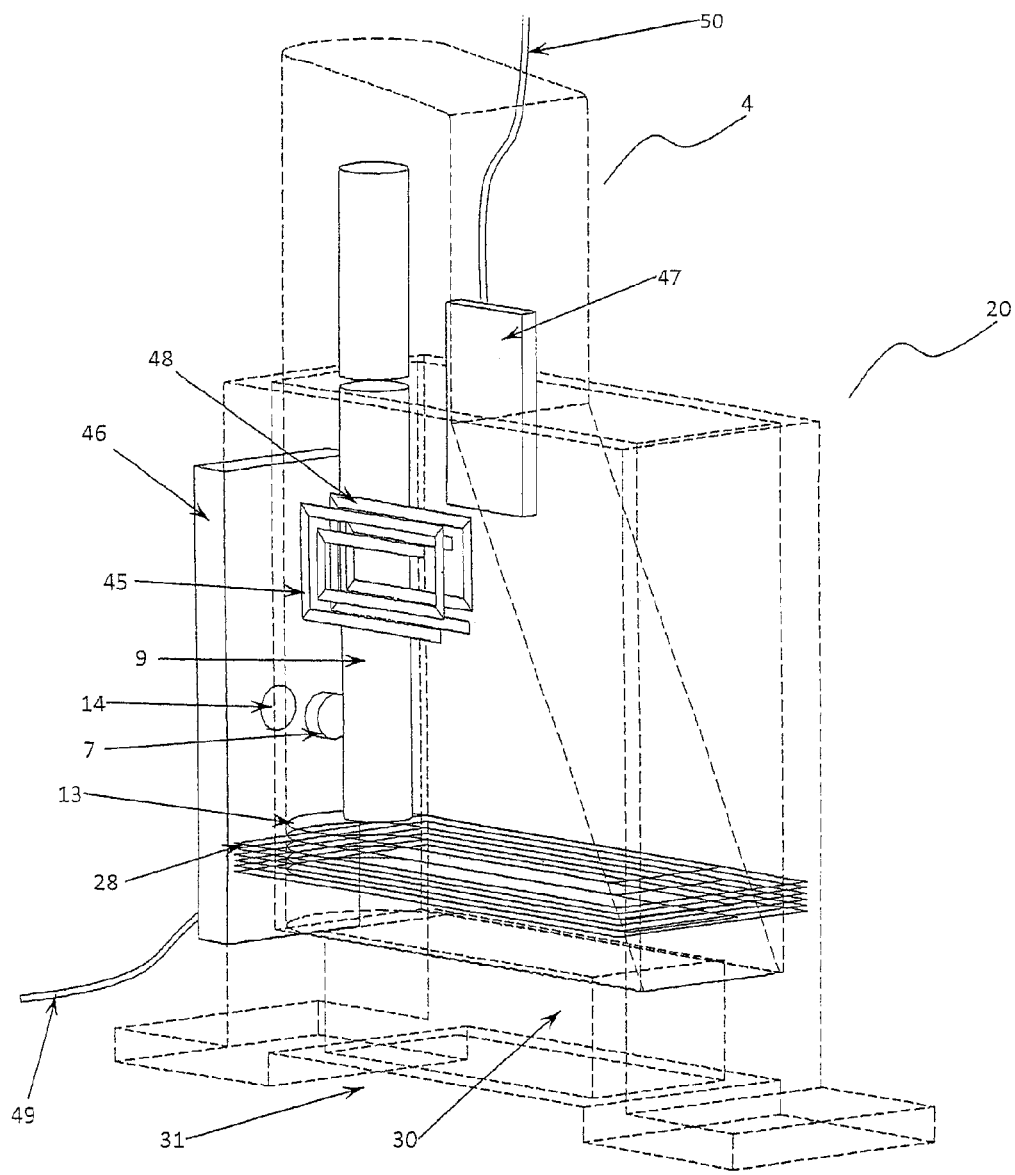
FIG. 11 is, in perspective view, the charging receiver of FIG. 10 with a corresponding alternative embodiment of the stock of FIG. 8.
Figure 12:
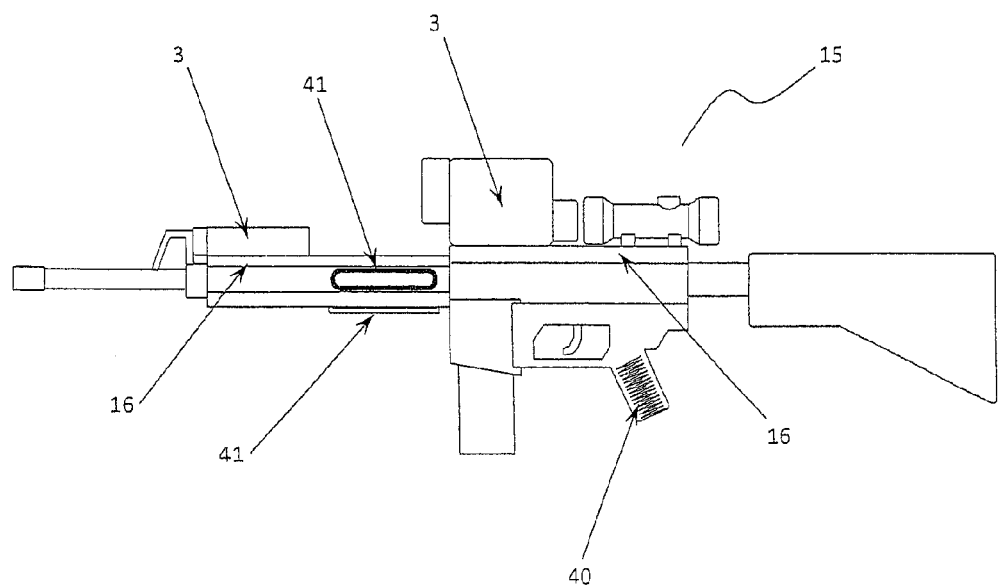
FIG. 12 is a further embodiment of the weapon of FIG. 3.

For a charging receptacle that interfaces to a weapons stock or hand grip, the coil geometry maybe of either a planar or cylindrical configuration. When utilising a planar coil configuration the secondary inductive or receiving coils would be placed on the flat sides or the end of the stock and interface to primary inductive coils located in proximal location on the charging receptacle (FIG. 5, 8). An alternate configuration is the use of a modified geometry cylindrical or elliptical secondary coil that may also be tapered towards one end, so as to accommodate the geometric shape of a weapon stock (FIG. 6, 9, 10). The charging receptacle may also be of a cylindrical format with the weapon stock inserted into the centre of the charging receptacle primary coil that is placed on a stand (FIG. 12, 13). Coils of either a cylindrical or planar configuration may be placed on the weapon stock, rifle grip or fore-grip of the weapon (FIG. 11). For weapons with steel sides such as a bullpup configuration, U or E-core coils can be embedded within the butt of the stock to provide a high coupling factor means of inductive power transfer.

If a secondary coil for the charging system is incorporated into the pistol grip or fore grip that would interface to a pedestal or yoke type primary charger (FIG. 12, 13) then either cylindrical or rectangular planar coils could be utilised in these weapon location and interfaces. Other configurations or weapon charger interfaces could be derived that use these two methods or alternate geometric forms of coil construction for either the primary or secondary coils.

The primary inductive coil within the charging receptacle may be advantageously of a low profile design to allow the volume of the charging receptacle to remain as small as possible. The coil designs may allow combined inductive coupling for the purpose of power and low rate data transfer. Coils can be wire wound using conventional enameled copper magnet wire, multi-filament Litz wire, coil designs etched into single, double sided or multi-layer printed circuit boards, single, double sided or multi-layer flexible substrates such as Mylar™ or Kapton™ etc and be of any geometric shape. The primary coil may be larger than the secondary weapon coil, or the secondary coil may be larger than the primary and each may be of a different shape. For example the primary receptacle coil may be elliptical in shape and the secondary coil circular or an ellipse rotated 90 degrees to the elliptical coil in the charger. Coils with a Q-factor from very low to greater than 100 can be used as the coil orientation is primarily fixed and therefore can accommodate a variety of coil designs and 'Q'. The higher the Q however, the better coupled the coils and overall system efficiency will be higher or more optimised. Depending on design considerations the primary charging receptacle may have one or more primary coils and the weapon stock may have one or more secondary coils.

To avoid heating during high power transfer, which may lead to over-heating of the coils, the direct current resistance (DCR) of the coils is kept low. Notwithstanding the advantage and constraints which lead to a low profile design referred to above, applicant has determined that a low profile may still be attained while maintaining low DCR, for example by increasing the number of windings in the coil. The higher the power transfer, the lower the DCR needed. For the sake of defining what is meant herein by high power transfer, in applicant's experience a low power transfer, such as attained in applicant's inductive power transfer garments referred to in the background above, may attain 5 Watts. As used herein then, a high power transfer is approximately at least twice the low power transfer, and thus approximately at least 10 Watts. At 10 Watts, applicant has determined that a DCR to avoid heating is no greater than substantially 0.2 Ohms. At 20 Watts, the DCR should be no greater than substantially 0.15 Ohms. At 50 Watts, the DCR should be no greater than substantially 0.12 Ohms. At 75 Watts, the DCR should be no greater than substantially 0.1 Ohms. At 100 Watts, the DCR should be no greater than substantially 0.075 Ohms. In testing coil designs, applicant has determined that effectively low DCR's may be obtained for high power transfer while still maintaining low coil profiles effective for the use in a hand-held portable weapon system. Put another way, sufficiently high power transfer has been achieved, for useful fast charging of weapons using inductive coupling alone, using low profile coils (and associated electronics) that fit within the weight, shape and size constraints associated with a hand-held portable weapon system such as that of the illustrated assault rifle and its charging mechanism, to give one example.

Ferrite backing can be of a simple round planar design or utilise more complex geometries (ovals, hexagon etc) in flat or cup or other profiles to accommodate location within the charger or weapon for the primary and secondary coils. The ferrite could be of conventional rigid ceramic or a flexible polymer based ferrite. If cylindrical coils are utilized, different cores and shell ferrite geometries can be used to enhance magnetic coupling and reduce RF emissions. The ferrite and coil assembly may be encapsulated in either a rigid or flexible protective polymer that would not only provide it with the environmental protection required but also provide it with the mechanical support and attachment points required for some of the iterations identified above.

The secondary coil would also be encapsulated within the weapon so that it is ruggedized and environmental proof.

Data Transmission

Future weapon electronic accessory devices or electronic weapons systems may require the ability to transfer data between the weapons systems and the soldier or the vehicle. The data may include, without intending to be limiting, text, still images, streaming video, audio, combinations of text, images, video audio, etc. When the weapon is in use by the soldier on patrol, for example, video streams from the weapon can be streamed to a soldiers tactical computer using wireless data transmission technologies. On arriving at a vehicle or at a base, there may be further requirement for data downloads from the weapon sensors such video footage, ambient environment sensors, the weapon central battery capacity and charge history or the type and number of rounds fired at specific GPS locations. A suitably equipped wireless charging receptacle may provide the ability to wirelessly download the weapon system using transmit/receive antennas located at appropriate location on the receptacle and the weapon.

If a receptacle is designed for charging at the weapon stock, then data transmit receive antennas can be installed at matching locations. This would allow the use of data transmission techniques such as standard Near Field Communication protocols that require close proximity (less than 10 cm) of the transmit and receive antenna. Other RF communication technologies that could work can also include Bluetooth, Wi-Fi or Zig Bee or NFC et cetera. The design and materials used to fabricate the outer enclosure of the receptacle can be chosen to provide shielding that prevents transmission of any communication signal outside of the charging receptacle enclosure. Other locations where short range data transmission technologies could be applied include the pistol and fore-grip areas of the weapon that would allow data transmission to a soldiers glove or sleeve. Regardless of the position of the data antenna on the weapon system, data can then be transferred between the weapon system and charging receptacle and when the weapon is removed from the charger and carried by the soldier, wireless data can be transferred between the weapon and the soldiers data and computer network.

DISCUSSION WITH REFERENCE TO THE FIGURES

FIGS. 1A-1F illustrate the various electrical energy distribution concepts identified by the 2009 weapons interoperability NATO/RTO study identified above.

The concepts include the current practice of individual devices, each with their own battery distributed on the weapon in what is known as Christmas tree approach, a single multi-functional accessory device, a one power source powers all of the weapon sensors, the battery of one sensor device powers all other devices, power provided by a combination of sources and power from external connector going to a soldier system central battery. A further power source location identified, was the central power source located in the hand grip of the weapon.

Figure 1A:
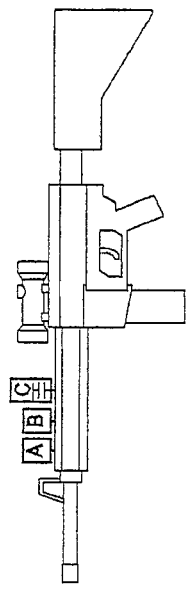
FIG. 1A-1F illustrate, in side elevation views, examples of electrical energy distribution on a weapon.
Figure 1B:
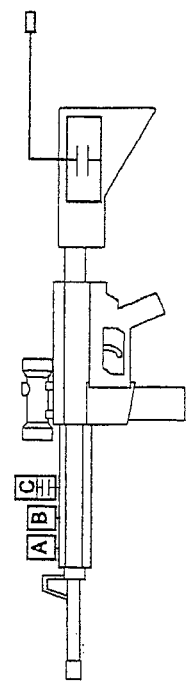
Figure 1C:
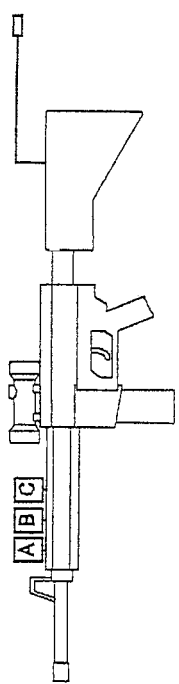
Figure 1D:
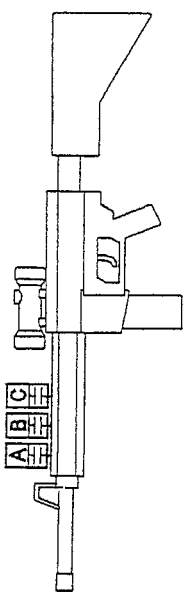
Figure 1E:
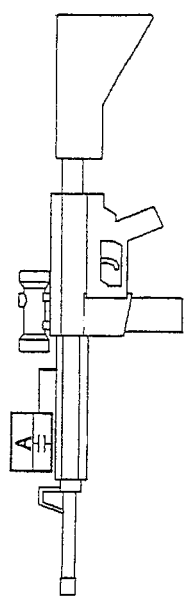
Figure 1F:
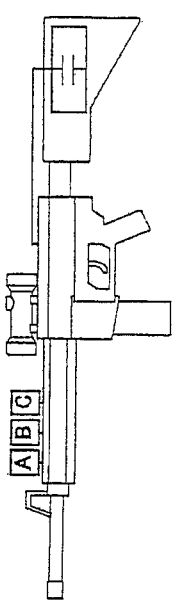
Figure 2:
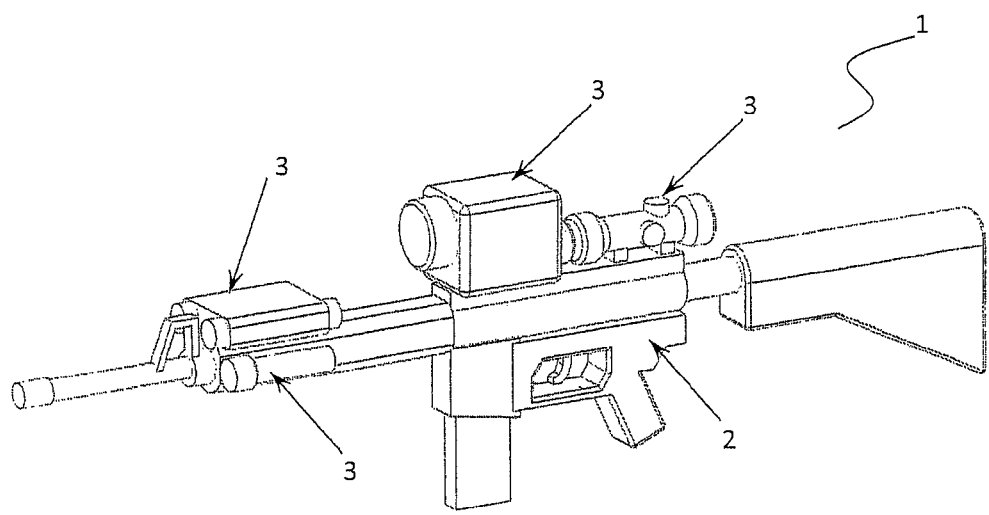
FIG. 2 is, in front perspective view, an example of a weapon having electrical accessories thereon.

FIG. 2 is an illustration of a modern man-portable weapon system 1, comprised of the weapon 2 itself serving as a support various electronic accessory devices or other power sinks 3. These devices may include such items as tactical light, electronic rifle scope, look through day or night vision, laser light module, thermal vision long range, thermal vision short range, fire control systems, Infra-Red sight, digital compass and weapon system information displays.

Figure 3:
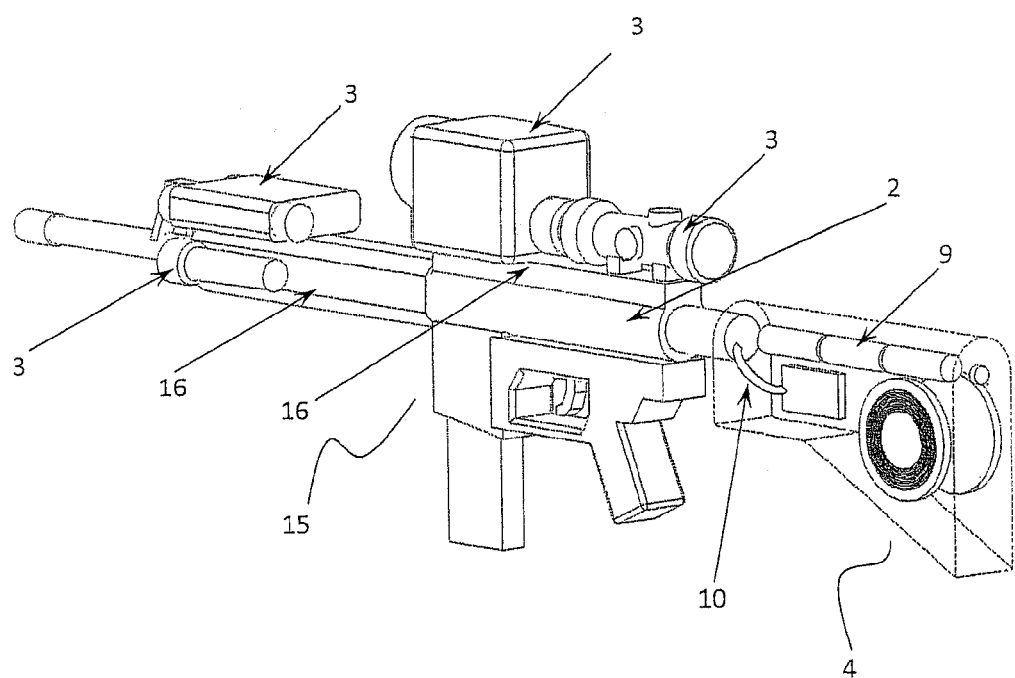
FIG. 3 is, in rear perspective view, the weapon of FIG. 2 wherein the stock is partially cutaway.

FIG. 3 shows a weapon 2 that includes a wirelessly charged weapon system 15 with an integrated wireless charging capability in the weapon stock 4. Electronic devices or power sinks 3, may be mounted on powered rails 16 which receive power through a cable 10 or other forms of conductors such as flexible circuits, that are connected to the central battery or other energy source 9. The central battery receives a wireless charge from a secondary inductive coil and voltage conditioning battery charging circuit all of which are embedded in the weapon stock 4.

There are many ways of implementing a wireless charging capability into a weapon system, some of which are shown by way of example, not intending to be limiting, in the figures. An expanded view of the integration of wireless charging system secondary components is shown in FIG. 4. FIG. 4 illustrates secondary planar coil windings 5 with ferrite backing 6 which comprise a coil assembly located in the left and right cheeks of the weapon stock 4. The secondary coil windings 5 receive a transmitted AC voltage inductively from the primary coils in the charging receptacle. The voltage conditioning circuit 8 receives the AC voltage from the coils 5. The voltage conditioning unit 8 contains a rectification circuit to convert the AC voltage to a DC voltage, a charging circuit, and if required an intermediate voltage regulation circuit. The charging circuit may be for any chemistry of rechargeable battery, super-capacitors or other high capacity energy sink. Depending on space and design constraints determined by the weapons design and configuration, the rectification, regulator and charging circuit may be housed within one unit, on one board or may be on individual boards in separate enclosures and not necessarily all located within the weapon stock. Charge power from the charger circuit is then provided to the central battery. Power from the battery pack 9 is then provided via the cable 10 to the weapons electronic devices 3, which are either mounted on power rails or directly to the weapon. An optional hall-effect proximity sensor trigger magnet 7 may also be incorporated into the stock if a hall effect sensor is utilised in the primary charging receiver/receptacle.

A weapon stock may be fitted with different geometries of secondary coil windings to allow it to be used in different types of chargers or circumstance. FIG. 5 shows a weapon stock 4 with planar coil assemblies including coil windings 5, and ferrite backing 6, on the left and right cheeks of the stock, and a rectangular planar coil 12 with a rectangular ferrite backing 11 placed on the butt end of the stock.

Further secondary coil implementations, not intended to be limiting, include in FIG. 6 a circumferential secondary coil design where the coil windings 13, wrap inside the outer perimeter of the stock. Ferrite cores or sheet can be placed behind the winding to enable enhanced coupling as shown in other designs are not shown in this figure for clarity purposes.

Yet another implementation is shown in FIG. 7, where the secondary coil assembly utilizes an elongated U-core ferrite 60 as a core for the secondary coil winding 61. The core is placed in a recess 62 at the butt end of the weapon stock 4. The recess is provided as a means of location for the primary coil assembly 67 to be located within the weapon stock. The primary coil assembly includes the environmental housing 63, primary ferrite core 64 and primary coil windings 65. AC power from the primary drive circuit (not shown) is provided to the primary coil assembly 67 via an umbilical cable 66. This implementation would allow a soldier on patrol in an open vehicle with the potential need to immediately shoulder a weapon and return fire, to charge the weapon while having it slung or sitting in a charging base or stand, and then being able to shoulder the weapon while maintaining charge or power to the weapon. The primary coil assembly, such as for example the rectangularly shaped dongle illustrated, would be retained within the stock receptacle using magnetics 68, mechanical latches or other means of a quick releasable attachment. In addition, this primary/secondary coil design can be utilized if the sides of a weapon are made of sheet metal, such as in the case of the L85A2 bullpup weapon, that would prohibit the transmission of magnetic flux between planar primary and secondary coils located on the cheek of the stock. Other opportunities to use this coil configuration exist in the case of a folding stock, where the stock has no cheek plates and only a butt rest for shouldering the weapon. A floor mounted variant for charging the weapon in a fixed position can also be provided that would interface to this coil design, for example where the dongle was mounted on the floor or on a stand or platform so as to protrude upwardly. The stock would then be placed downwardly so as to mate the dongle into the receptacle on the stock. Other shapes, sizes, and orientations of charging bases, including the use of charging dongles, would also work.

FIG. 8 shows a weapon system 15 with electronic accessories and integrated secondary inductive charging contained within the stock located inserted into a charging receptacle 20. The receptacle can be designed such that the weapon is held at any angle from vertical through to horizontal.

Figure 9:
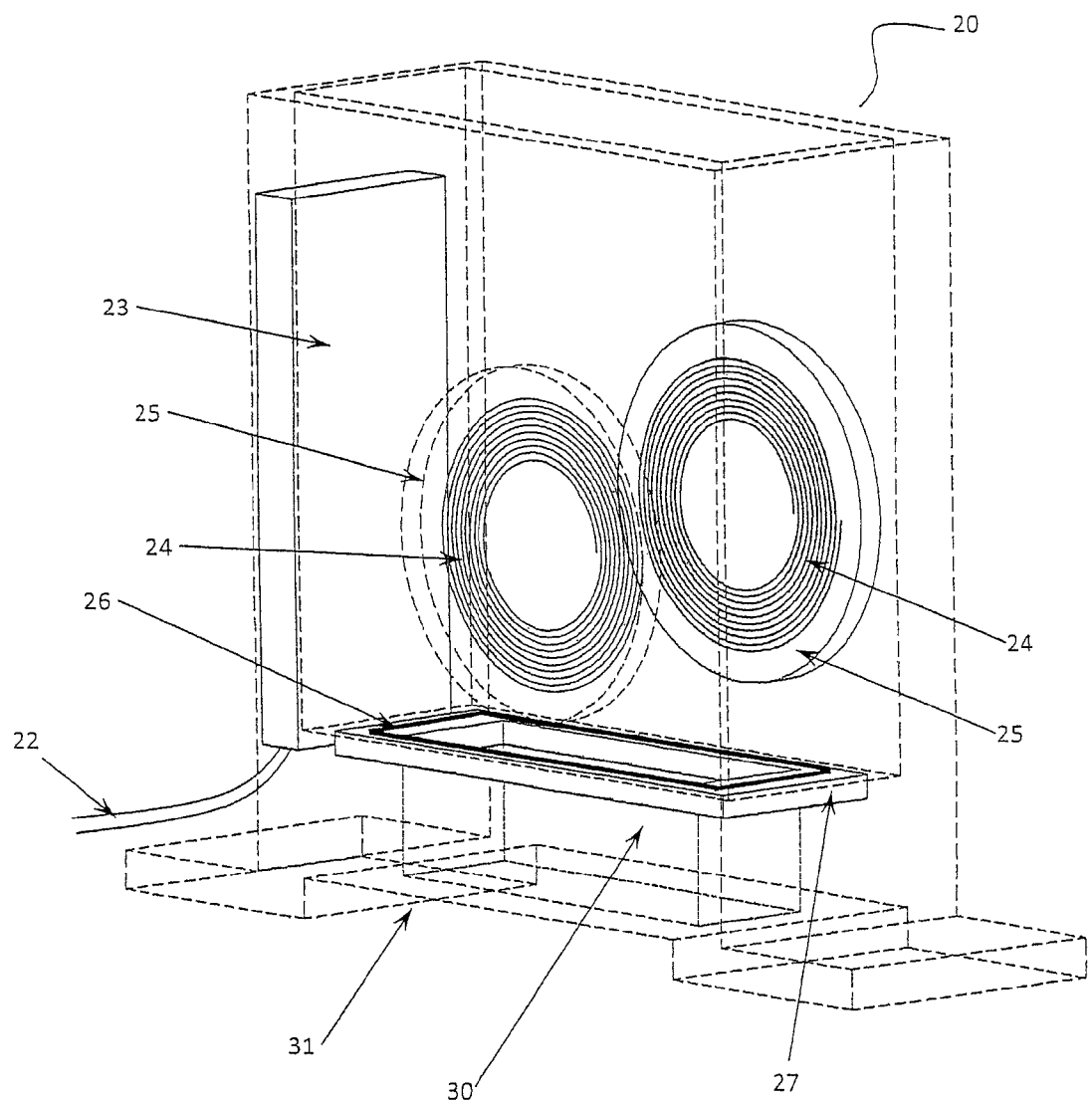
FIG. 9 is, in enlarged view, the charging receiver of FIG. 8.

FIG. 9 provides a more detailed view of one embodiment, not intended to be limiting, of a primary inductive charging receptacle 20. Electrical power from the vehicle is provided by an electrical cable 22, to the primary inductive drive electronics that are contained within the primary drive electronics environmental-proof enclosure 23. AC power to the primary inductive coil assemblies comprised of the coil winding 24 and optional ferrite backing 25 can be located on one or both sides of the receptacle. The diagram also shows a rectangular primary coil assembly with coil windings 26 and a ferrite backing 27 with a central aperture. This may be used to charge weapons with a secondary planar coil (see FIG. 5; 11, 12) in the butt of the weapon. The charging receptacle is designed with a through passage 30 in the base, and a channel 31 through the mounting surface to prevent accumulation of dirt and debris or other detritus in the charger and let the fluid or solid detritus pass through the charging receptacle and be ejected or cleaned away. The main body and inside surfaces of the charger can be constructed from an engineered polymer or other non-magnetic, non-metallic material, however the outside surface may be a metallic material if required.

Figure 10:
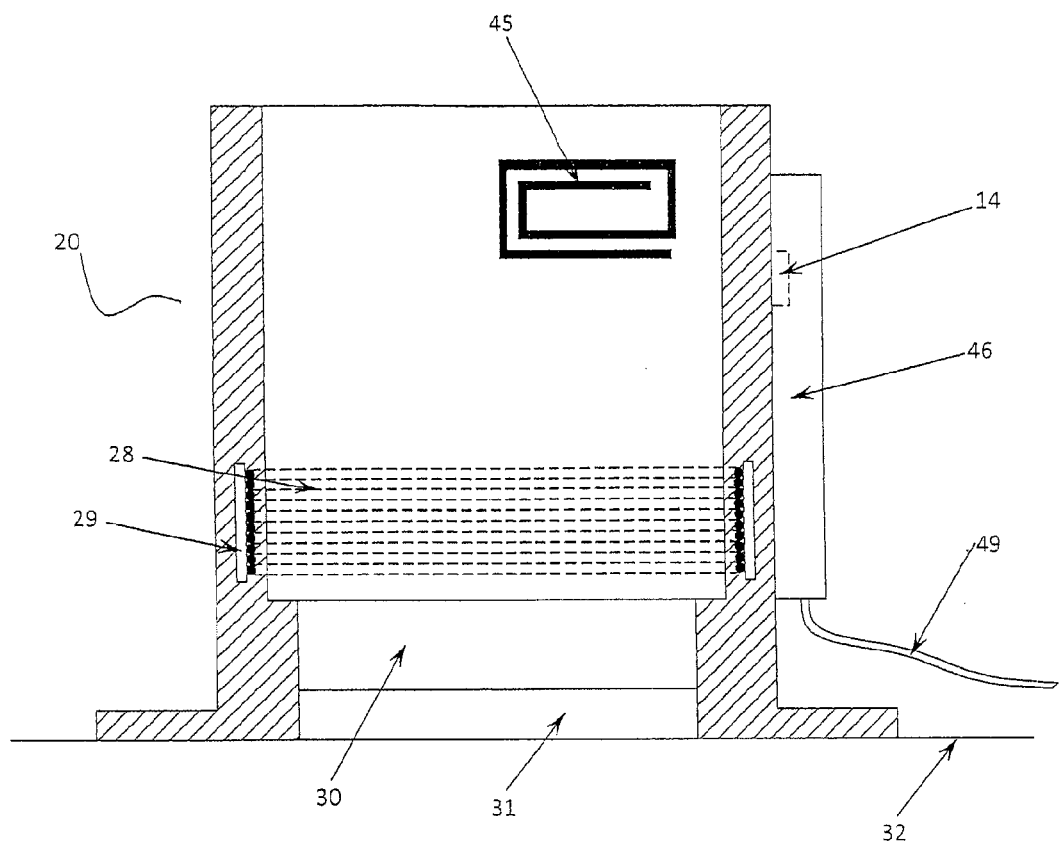
FIG. 10 is a cross-sectional view of a further embodiment of the charging receiver of FIG. 8.

One of many secondary coil configurations is for the windings to be placed circumferentially around the end of the weapon stock as shown in FIG. 6. FIG. 10 illustrates a cross section of floor or surface 32 mounted charger receptacle 20 with a circumferential winding of the primary coil 28 backed by optional ferrite tiles 29 that would be used to enhance primary to secondary coil inductive coupling and to provide a measure of magnetic shielding. The charging receptacle 20 has a hall effect sensor 14 to sense the insertion of a weapon as an alternative to mechanical or inductive polling sensing techniques. If the wireless transfer of data or communications is required between the weapon system and the charging receptacle then RF communication between the weapon and charger can be facilitated by, but not being limited to, NFC, Wi-Fi, Bluetooth or Zig Bee et cetera.

Depending on the RF technology used an appropriate antenna 45 may be incorporated into the charger housing. The primary inductive drive circuit and data transmit/receive circuits are enclosed with the electronics charging receptacle housing 46, with electrical power and data connection to the vehicle made over a power and data cable 49.

FIG. 11 is an illustration of weapon stock 4 equipped with inductive secondary power components and the capability to receive wireless data via the weapon wireless data antenna 48 that is also integrated into the stock 4, inserted into a charging receptacle 20. Wireless data transmit and receive circuits can be embedded within the stock with the secondary inductive power circuits 47, with data and power cable connections 50 to devices such as thermal imagers, video cameras and tactical displays. The data antenna maybe of a planar or 3D configuration. The weapon integrated wireless data antenna will also allow wireless data connection between the weapon system and the soldier systems data and computing network when the soldier is carrying the weapon.

Additional locations, without intending to be limiting, for mounting secondary charging coils on the weapon system 15 are shown in FIG. 12. Locations such as the fore grip of the weapon can be used to mount or integrate elongated planar secondary coils 41 and other geometries of coil winding and ferrite backing. The pistol grip may also be fitted with cylindrical coil windings 40, or planar style windings.

Figure 13:
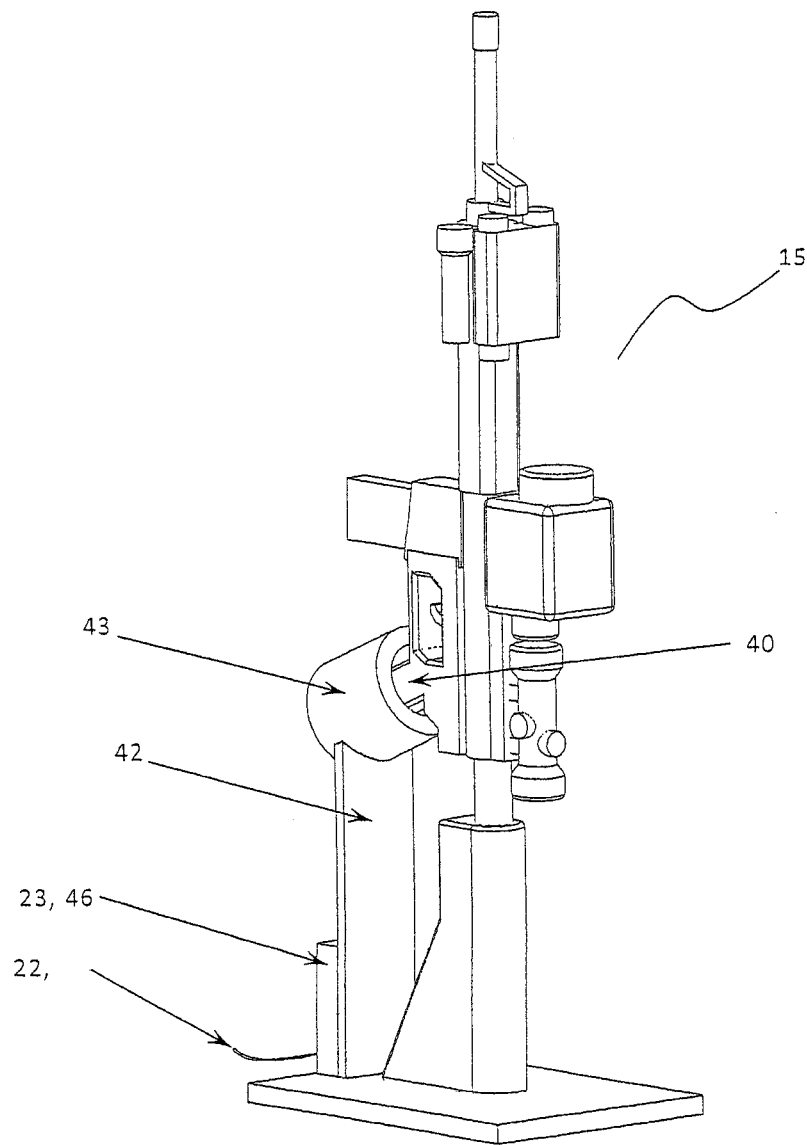
FIG. 13 is a further embodiment of a charging receiver, adapted for charging the weapon of FIG. 12.
Figure 14:
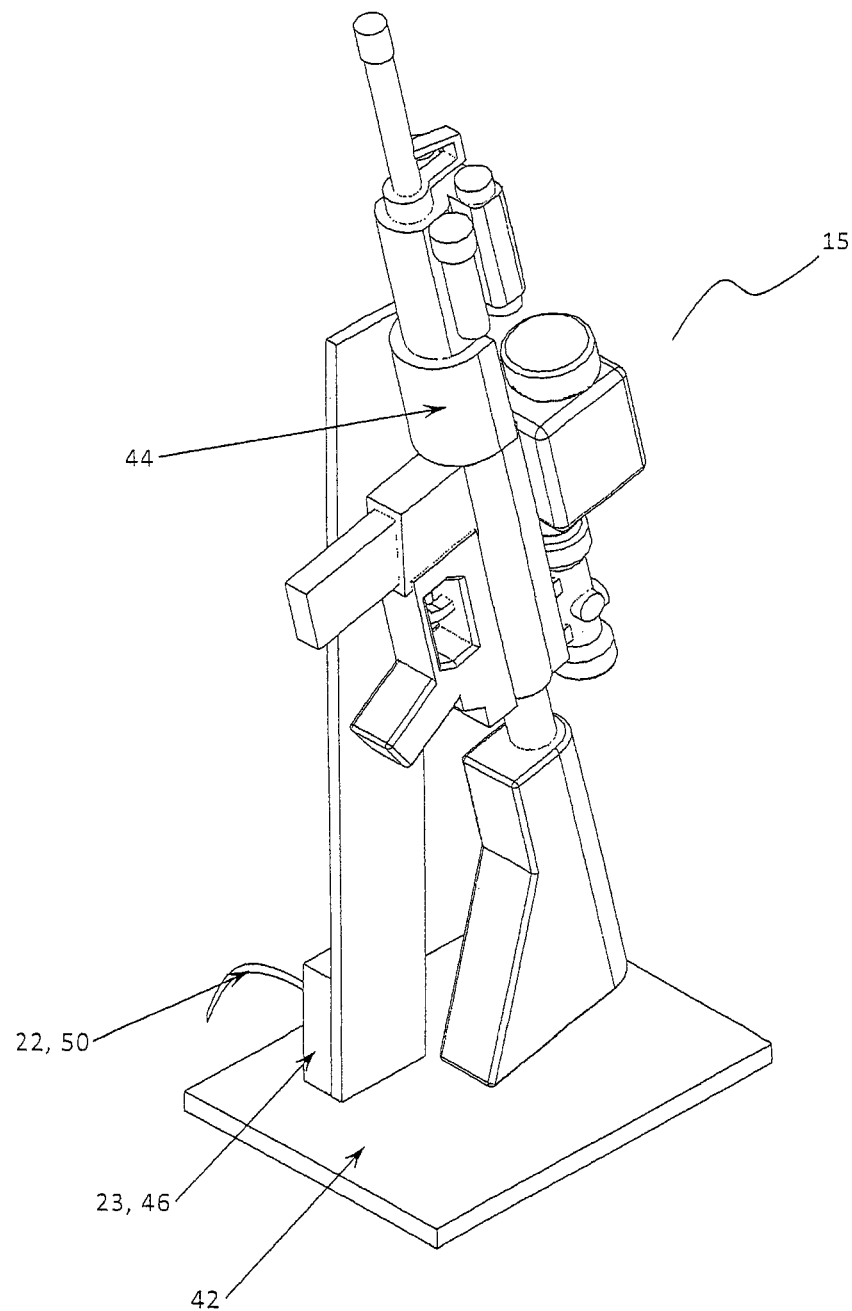
FIG. 14 is yet a further embodiment of a charging receiver, adapted for charging the weapon of FIG. 12.

FIG. 13 is an illustration of a pedestal type 42 charging stand that allows the charging of a weapon 15 with an inductively equipped wireless charging system to be charged without using a electro-mechanical connector. The weapon may have for example a cylindrical or planar secondary inductive coil winding on the pistol grip 40 that is placed into a female receiver such as receiving tube 43 that has an internal primary inductive cylindrical winding. High frequency AC power is provided to the primary winding by the primary power electronics that are contained within an environmental proof housing 23, 46 which receives power and data from the vehicle via an electrical cable 22, 50. Data antennas can be placed within the pedestal cylindrical primary charging tube and on the pistol grip to allow shielded data transmission. An alternative pedestal configuration, again not intended to be limiting, is shown in FIG. 14, where the primary coil is placed within or leaned against a half cylinder or channel cradle 44 that supports the weapon to be charged.

Figures 15A, 15B:
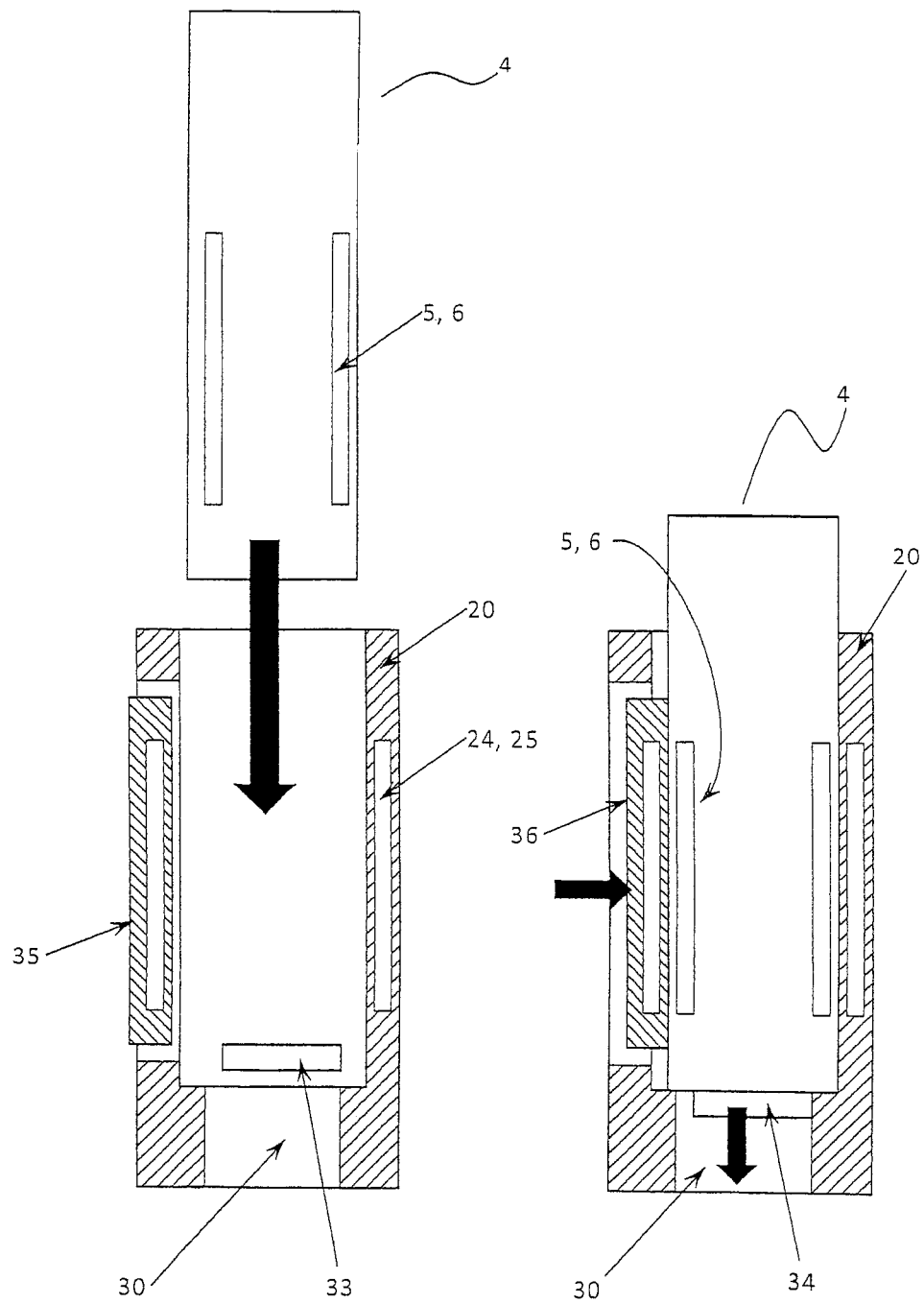
FIG. 15A is a cross-sectional view of a further embodiment of a receiver, wherein the receiver has clamping sidewalls shown in the open position, and a stock being mated downwardly therein.
FIG. 15B is the view of FIG. 15A with the sidewalls shown in their closed, clamped position on the stock mated in the receiver.

Frequently, vehicles, vessels or other weapons system platforms support soldiers that carry weapons that have different stock configurations or shapes, depending on the role or function of the weapon. To accommodate different thickness or shape of stock it may be required that the receptacle adjust to the external profile of the stock of the weapon. FIGS. 15A and 15B are cross-section illustrations of a self-adjusting receptacle. The receptacle 20, may have two adjustable coil plates that each adjust or as shown in FIG. 15A, one primary coil 24 and ferrite backing 25 is fixed while the opposing secondary coil and ferrite is contained within a movable housing or plate 35. When the weapon stock 4 with integrated secondary inductive coils, and for example ferrite backing 6, is placed into the receptacle as shown in FIG. 15B, the stock engages with an actuator 34 that moves the clamping plate with primary coils 36 into a charging position against the stock 4. The plate may be mechanically actuated by a lever, or through electrical, pneumatic, hydraulic circuits. The clamping coil plate maybe located on a pivot mechanism such that the plate can engage the stock at simple horizontal or vertical angle or at a more complex compound or polar angle. Fluid draining and debris ejecting passages 30 within the charging receptacle 20 can still be accommodated in a moving plate design. Other variants of a clamping or actuated primary coil plate will be known to, and may be implemented by someone skilled in the art.

Figure 16:
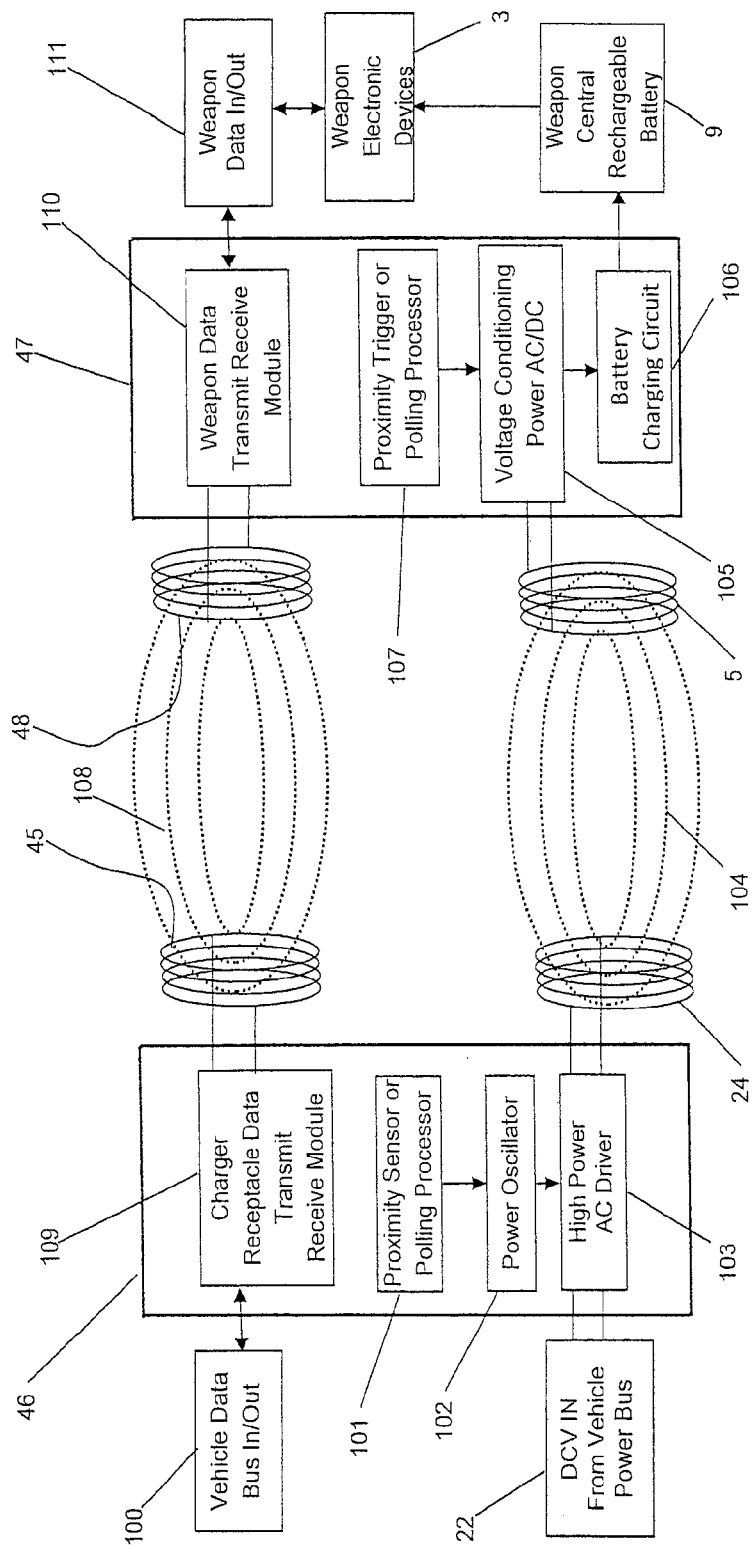
FIG. 16 is a schematic diagram of a high power and data transmission system using inductive coupling.

FIG. 16 presents a schematic block diagram of wireless inductive power transmission and wireless data transmission between a charging receptacle and a weapon system. The inductive power and data circuits are mutually exclusive and either maybe implemented without the other. Electrical power from the vehicle bus 22 is provided to the primary inductive drive and data circuit 46. The inductive power drive is comprised of an oscillator circuit 102 which provides a switching frequency to a high power AC drive switch circuit 103. The high power drive circuit is only turned kept on when the proximity sensor or polling circuit 101 validates that a weapon with a power receiving secondary circuit is in place ready to accept transferred power. When the AC drive circuit is energized AC power is provided to the primary inductive coil windings 24, which inductively or resonantly connect to the secondary coil windings 5 through a fluctuating magnetic field 104. The AC power received by the secondary coil windings 5 is provide to the secondary electronics within the weapon stock 47 where it is rectified and conditioned by the voltage conditioning circuit 105 which provides the DC voltage output to the battery or energy storage device charging circuit 106. The charging circuit maintains charge on the weapon systems battery or energy storage device 9 which in turn provides electrical power to the weapons accessory devices 3. The secondary voltage conditioning circuit 105 has a communications sub-circuit 107 that allows it to inductively communicate with the transmitter or primary oscillator circuit 102 through the inductive power coils 5, 24 using the power magnetic flux as a carrier signal to ensure that high power transfer is only kept on when a weapon system is inserted into the charging receptacle.

Data from the weapon devices maybe wirelessly transferred between the weapon and the charging receptacle. Data 111 produced or required by a weapon device 3 is passed to a data transmitter—receiver module 110 that allows the data to be transmitted or received via an antenna 48 and transmitted or received wirelessly 108 by the charging receptacle via any method of wireless data communication such as Bluetooth, Wi-Fi, Zig Bee or NFC for example. The wireless data is transmitted or received by the antenna 45 on charging receptacle where it is processed by the wireless data module 109 for communication through to the vehicle data bus 100.

Future Weapons

Weapons of the future will inherently incorporate electronics. New weapons that are being fielded today that were the future weapons of yesterday, are using smart laser guided munitions that are programmed at the moment they are fired. Laser range finders, targeting system and many other accessory devices as they become smaller, will eventually be integrated into the weapon with a rechargeable weapon system battery or energy source providing the electrical power. The type of weapon, the type of projectile it fires or launches (whether a munition, surveillance, or other form of projectile) and its propellant may all utilize electronics to enhance the weapon's functionality.

Weapons in development that utilize electric power and that may benefit from a wirelessly charged rechargeable energy source include weapon systems that include smart self guided bullets or other projectiles, directed energy weapons that may include low power level laser dazzlers to high power laser, maser, sonic, particle beam or micro-projectile weapons for example. Technologies that have a longer development window, ie that are envisioned for the future, include for example micro-projectile portable rail guns that apply electrically powered magnetic fields to accelerate or propel projectiles. These type of weapons may utilize rechargeable central power sources that require considerable amounts of rapid power transfer. Other man-portable devices may include launch platforms or systems for mini or micro-drones such as micro-air vehicle (MAV) for individual or swarm deployment.

An example of a newly fielded man-portable weapon is the US Army XM25 CDTE which fires 25 mm grenades that are set to explode in mid-air at or near the target. A laser rangefinder in the weapon is used to determine the distance to the target. The user can manually adjust the detonating distance by up to 10 feet (3.0 m) shorter or longer; the XM25 automatically transmits the detonating distance to the grenade in the firing chamber. The grenade tracks the distance it has traveled by the number of spiral rotations after it is fired, then detonates using an electronic fuse at the proper distance to produce an air burst effect. These features make the XM25 more effective than traditional grenade launchers at the task of hitting targets that are behind cover or dug into the ground. The XM25 features the following electronic components: thermal sight, laser rangefinder, ballistic computer, digital compass (cant, bearing, tilt), electronic fuze setter, internal display, environmental sensors. Of the few improvements to be made to the XM25, one is to extend its battery life.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. For use in a weapon system containing a charger and a man-portable weapon having a corresponding energy source, a charging system for the wireless inductive charging of the energy source in the weapon, the system comprising:

a first portion of the weapon system, wherein said first portion has a first inductive coil therein, a female receiver sized for receiving, in a male-female mating engagement, said first portion of the weapon system, said receiver having a second inductive coil positioned to inductively couple with said first inductive coil when said first portion of the weapon system is in said male-female mating engagement with said receiver, said first inductive coil adapted for electrical connection to a weapon system platform electrical power supply and wherein said first inductive coil has a direct current resistance of less than or equal to substantially 0.2 Ohms so as to be adapted to provide charging power having a peak power of at least substantially 10 watts, wherein said weapon system platform electrical power supply is an integrated power supply on a weapon system platform chosen from the group which includes: a motorized vehicle, an aircraft, a water-bourne craft, a water-submersible craft, a spacecraft, a forward-operating base.

2. The system of claim 1 wherein said receiver has a drain adapted to facilitate draining and cleaning environmental fluids, and solids, from said receiver and wherein said receiver is positioned, when in use in a use position, so as to drain from said drain said environmental fluids, and is, in said use position, adapted for ejection of solids collecting in said receiver while said first portion of the weapon system is in said mating engagement with said receiver, and wherein said receiver defines a support cavity, for supporting in said support cavity said first portion of the weapon system when said first portion of the weapon system is in said mating engagement, and wherein said cavity is sized relative to said first portion of the weapon system for a snug fit therebetween and to allow said draining and ejection of said environmental fluids and solids from said support cavity.

3. The system of claim 1 wherein said receiver is chosen from the group comprising:

a) a stock receptacle formed in a stock of the weapon, wherein said first portion of the weapon system is a charging base, b) an inclined rest wherein said first portion of the weapon system is a portion of the weapon, and wherein said first portion of the weapon rests on, so as to be supported in said mating engagement, on said rest, c) a platform receptacle wherein said first portion of the weapon system is a portion of the weapon, and wherein said first portion of the weapon is slidably journalled in said receptacle, d) a storage means.

4. The system of claim 1 wherein said first inductive coil has a direct current resistance of less than or equal to substantially 0.15 Ohms so as to be adapted to provide charging power having a peak power of at least substantially 20 watts.

5. The system of claim 4 wherein said first inductive coil has a direct current resistance of less than or equal to substantially 0.12 Ohms so as to be adapted to provide charging power having a peak power of at least substantially 50 watts.

6. The system of claim 5 wherein said first inductive coil has a direct current resistance of less than or equal to substantially 0.1 Ohms so as to be adapted to provide charging power having a peak power of at least substantially 75 watts.

7. The system of claim 6 wherein said first inductive coil has a direct current resistance of less than or equal to substantially 0.075 Ohms so as to be adapted to provide charging power having a peak power of at least substantially 100 watts.

8. The system of claim 3 wherein said charging base is a dongle.

9. The system of claim 8 wherein charging base further includes a flexible, electrically conductive umbilical adapted to be attached to, so as to extend between, said dongle and said platform electrical power supply.

10. The system of claim 3 wherein said stock receptacle is formed in a butt end of said stock, adjacent a user when said weapon is in said use position.

11. The system of claim 3 wherein said inclined rest or said platform receptacle are mounted elevated on a stand.

12. The system of claim 3 wherein said platform receptacle is mounted to one of said platforms.

13. The system of claim 2 wherein said drain on said stock receptacle or said platform receptacle is an opening at a lower end of said support cavity when in said use position.

14. The system of claim 3 wherein said platform receptacle includes a tube or channel defining said support cavity.

15. The system of claim 1 wherein said receiver is shielded and wherein said first portion of the weapon system and said receiver are adapted for data transfer therebetween using inductive coupling therebetween.

16. A charging system for the wireless inductive charging of an energy source associated with a weapon system which includes a weapon, wherein the weapon system includes a charging portion, the charging system comprising:
  a charging portion of the weapon system, wherein said charging portion includes a first inductive coil,
  a charging base having a second inductive coil,
  said charging portion and said charging base adapted to inductively couple with one another in a male-female mating engagement so as to form an inductive coupling,
  wherein at least one of said charging portion, said charging base includes a drain for removal of environmental detritus, solids, or fluids from within intervening proximity with said inductive coupling,
  said first inductive coil adapted for electrical connection to a weapon system platform electrical power supply and wherein said first inductive coil has a direct current resistance of less than or equal to substantially 0.2 Ohms so as to be adapted to provide charging power having a peak power of at least substantially 10 watts,
  wherein said weapon system platform electrical power supply is an integrated power supply on a weapon system platform chosen from the group which includes: a motorized vehicle, an aircraft, a water-bourne craft, a water-submersible craft, a spacecraft, a forward-operating base.

17. The charging system of claim 16 wherein the weapon has a stock and wherein said charging portion is said stock of the weapon, wherein said charging base is chosen from the group comprising:
  a) a plug-in dongle, and wherein said charging portion includes a cavity sized to receive said dongle into said inductive coupling,
  b) a receiver sized to receive said charging portion therein into said inductive coupling.

18. The system of claim 17 wherein said first inductive coil has a direct current resistance of less than or equal to substantially 0.15 Ohms so as to be adapted to provide charging power having a peak power of at least substantially 20 watts.

19. The system of claim 18 wherein said first inductive coil has a direct current resistance of less than or equal to substantially 0.12 Ohms so as to be adapted to provide charging power having a peak power of at least substantially 50 watts.

20. The system of claim 19 wherein said first inductive coil has a direct current resistance of less than or equal to substantially 0.1 Ohms so as to be adapted to provide charging power having a peak power of at least substantially 75 watts.

21. The system of claim 20 wherein said first inductive coil has a direct current resistance of less than or equal to substantially 0.075 Ohms so as to be adapted to provide charging power having a peak power of at least substantially 100 watts.

22. The charging system of claim 17 wherein said dongle is mounted on a flexible electrical cord.

23. The charging system of claim 17 wherein the weapon has a butt and wherein said charging portion of the weapon is said butt of the weapon.

24. The charging system of claim 17 wherein said receiver is mounted on a stand, and wherein said stand is adapted for mounting to said platform.

25. The charging system of claim 17 wherein said receiver is an upwardly-opening charging receptacle adapted to receive said charging portion, and wherein said charging portion is held, at least in part, in said charging receptacle by gravity acting on the weapon.

26. The charging system of claim 25 wherein said charging receptacle has an upwardly opening cavity for receiving said charging portion therein in said inductive coupling, and wherein said cavity provides for substantially vertical entry of said charging portion into said charging receptacle.

27. The charging system of claim 26 wherein the weapon includes a butt, and said charging portion includes said butt of the weapon.

28. The charging system of claim 25 wherein said charging receptacle has an upwardly opening cavity for receiving said charging portion therein in said inductive coupling, and wherein said cavity is angled from the vertical to provide for angularly inclined entry of said inclined portion into said charging receptacle.

29. The charging system of claim 28 wherein said charging receptacle is an inclined weapon rest.

30. The charging system of claim 28 wherein said charging receptacle is an inclined tube.

31. The charging system of claim 29 wherein said charging portion is chosen from the group including handgrip, forestock, pistol grip, trigger grip, shoulder-stock, butt, magazine.

32. The charging system of claim 30 wherein said charging portion is chosen from the group including handgrip, forestock, pistol grip, trigger grip, shoulder-stock, butt, magazine.

33. The charging system of claim 17 wherein said receiver includes a clamping mechanism, and wherein a contact sensor or non-contact sensor react to the presence of said charging portion in said receiver, and surfaces of said receiver respond so as to translate or rotate into close adjacency with said charging portion.

* * * * *